(12) United States Patent
Tvetene et al.

(10) Patent No.: US 8,118,154 B2
(45) Date of Patent: Feb. 21, 2012

(54) SOD HANDLER

(75) Inventors: Michael Tvetene, South Billings, MT (US); Donald Tvetene, Billings, MT (US); Gregg Tvetene, Billings, MT (US)

(73) Assignee: Trebro Holding, Inc., Billings, MT (US)

( * ) Notice: Subject to any disclaimer, the term of this patent is extended or adjusted under 35 U.S.C. 154(b) by 0 days.

(21) Appl. No.: 12/756,049

(22) Filed: Apr. 7, 2010

(65) Prior Publication Data

US 2010/0187071 A1    Jul. 29, 2010

Related U.S. Application Data

(62) Division of application No. 11/096,242, filed on Mar. 30, 2005, now abandoned.

(60) Provisional application No. 60/628,053, filed on Nov. 15, 2004.

(51) Int. Cl.
*B65G 47/52*       (2006.01)
*B65G 37/00*       (2006.01)

(52) U.S. Cl. .................. 198/468.8; 198/346.3; 198/817; 198/689.1

(58) Field of Classification Search ............... 198/468.8, 198/346.3; 414/25, 24.5, 489
See application file for complete search history.

(56) References Cited

U.S. PATENT DOCUMENTS

| | | | |
|---|---|---|---|
| 1,756,614 A | 4/1930 | Wiener | |
| 2,699,264 A | 1/1955 | Bruce et al. | |
| 3,297,174 A | 1/1967 | Letchworth | |
| 3,531,001 A | 9/1970 | Lunden | |
| 3,580,375 A | 5/1971 | Nunes, Jr. | |
| 3,606,310 A | 9/1971 | Larson | |
| 3,642,155 A * | 2/1972 | Carlson | 414/523 |
| 3,675,793 A | 7/1972 | Wetzel | |
| 3,743,340 A | 7/1973 | Williamann | |
| 3,759,402 A | 9/1973 | Hitch et al. | |
| 3,788,496 A | 1/1974 | Webb et al. | |
| 3,834,298 A | 9/1974 | Paschal et al. | |
| 3,887,013 A | 6/1975 | Helberg | |
| 3,910,620 A | 10/1975 | Sperry | |
| 3,935,904 A | 2/1976 | Beck | |
| 3,970,341 A | 7/1976 | Glanemann et al. | |
| 4,162,709 A | 7/1979 | Wilson | |
| 4,162,726 A | 7/1979 | Hudson et al. | |
| 4,236,855 A | 12/1980 | Wagner et al. | |
| 4,294,316 A | 10/1981 | Hedley et al. | |
| 4,561,044 A * | 12/1985 | Ogura et al. | 362/84 |
| 4,591,044 A * | 5/1986 | Ogami et al. | 198/346.3 |
| 4,925,225 A | 5/1990 | Dost | |
| 5,098,079 A | 3/1992 | Sanborn, III | |

(Continued)

FOREIGN PATENT DOCUMENTS

EP      1391146 A1    2/2004

*Primary Examiner* — Kavel Singh
(74) *Attorney, Agent, or Firm* — Holland & Hart, LLP

(57) ABSTRACT

A sod handling method and a sod handling apparatus, in one embodiment the sod handling apparatus uses a pressure differential to hold a sod slab during sod transfer, other embodiments include a sod lift member for lifting sod, a sod transport mechanism for moving sod; a sod carriage for transporting sod, a sod bed positioning system for stacking sod, a system and method for checking sod quality as well as an apparatus and method of machine stacking sod to maintain the integrity of a sod stack.

10 Claims, 13 Drawing Sheets

U.S. PATENT DOCUMENTS

| | | |
|---|---|---|
| 5,217,078 A | 6/1993 | Zinn |
| 5,221,117 A | 6/1993 | Messinger et al. |
| 5,330,314 A | 7/1994 | Bennison |
| 5,431,469 A | 7/1995 | Ohno et al. |
| 5,540,545 A | 7/1996 | Roberts et al. |
| 5,569,350 A * | 10/1996 | Osada et al. ............. 156/345.51 |
| 5,653,574 A | 8/1997 | Lin |
| 5,700,128 A | 12/1997 | Tonnigs et al. |
| 5,746,427 A | 5/1998 | Hamid |
| 5,816,635 A | 10/1998 | Jansson |
| 5,844,807 A | 12/1998 | Anderson et al. |
| 6,056,500 A | 5/2000 | Wicen |
| 6,112,680 A | 9/2000 | Hummer |
| 6,296,063 B1 | 10/2001 | Tvetene et al. |
| 6,345,850 B1 | 2/2002 | Foust |
| 6,364,027 B1 | 4/2002 | Tvetene et al. |
| 6,681,864 B2 | 1/2004 | Tvetene et al. |
| 6,719,522 B1 | 4/2004 | Gunther |
| 6,779,610 B2 | 8/2004 | Brouwer et al. |
| 6,783,318 B2 | 8/2004 | Tvetene et al. |
| 2005/0000704 A1 | 1/2005 | Brouwer et al. |
| 2006/0102363 A1 | 5/2006 | Tvetene et al. |

\* cited by examiner

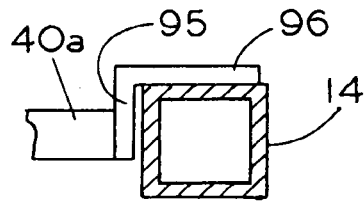
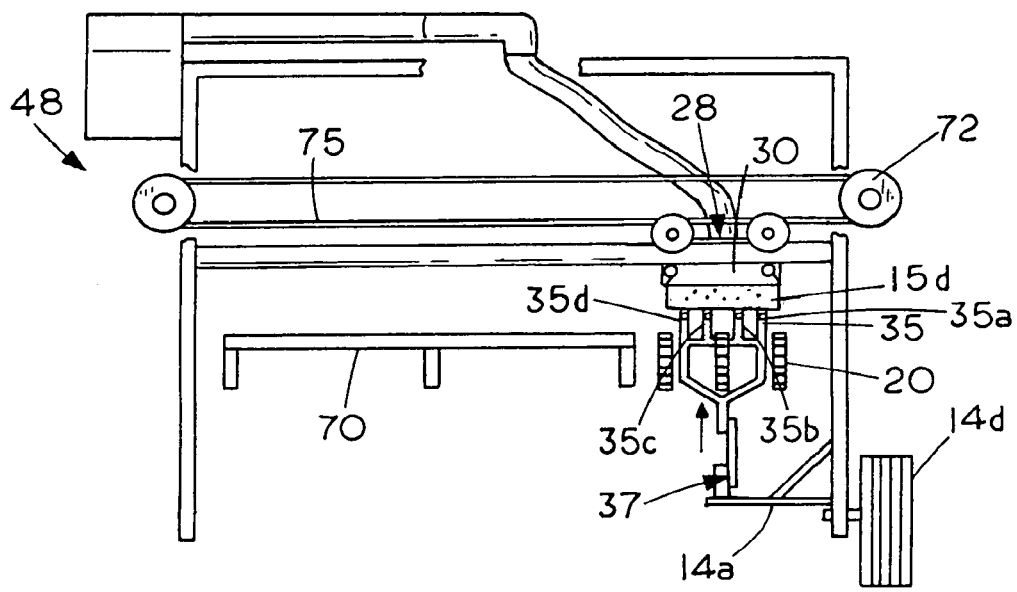
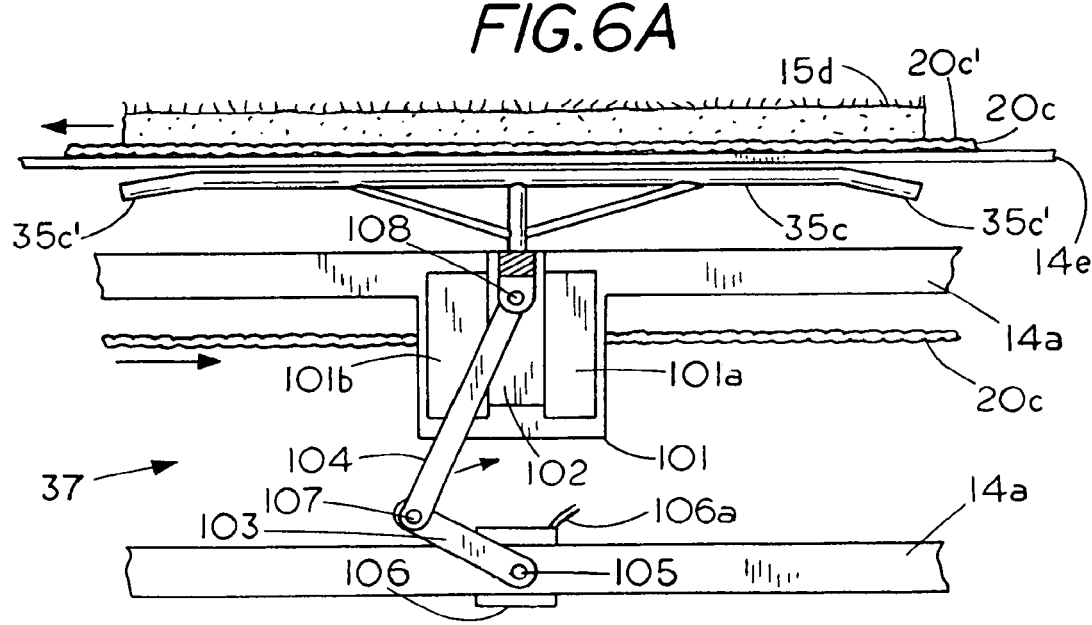

SOD HANDLER

CROSS REFERENCE TO RELATED APPLICATIONS

This application claims priority from provisional patent application titled Sod Transfer Mechanism Ser. No. 60/628,053 filed Nov. 15, 2004.

FIELD OF THE INVENTION

This invention relates generally to sod harvesting, and more specifically, to a sod harvester, a sod transfer mechanism, a sod lift mechanism, a sod transfer mechanism, a sod bed positioning system, a sod quality monitor, with the method including a method of transferring sod using a pressure differential to support a sod slab and a method of machine stacking sod slabs.

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of a sod harvesting machine to cut slabs of sod from a sod field and then prepare the sod slabs for transport to a work site is known in the art. Once the sod slab is at the work site the sod slabs are laid down on top of the soil to enable the grass in the sod to take root in the soil. The use of sod handling machines is also known in the art. One way of handling the sod after the sod slab is cut from the field is to roll the sod slab into a cylindrical sod roll. One can then transport the sod to the work site where the sod is unrolled as the sod is laid down at the work site. Examples of sod handling apparatus are shown in our U.S. Pat. Nos. 6,783,318; 6,681,864; 6,364,027; and 6,296,063 which I hereby incorporated by reference.

Another way of handling a cut sod slab is to leave the sod slab in a flat or unrolled condition and pile the sod slabs on a pallet and then transfer the pallet with the sod slabs to a work site where the sod slabs are removed from a pallet and laid on the top soil.

Whether the sod slabs are rolled or left in a flat condition the sod slabs need to be transferred from one location to another location without destroying the integrity of the sod slabs.

One of the difficulties with handling sod slabs in an unrolled condition is that it is sometimes more difficult to transfer an unrolled or flat sod slab as opposed to a compact sod roll since the integrity of sod slab is affected by numerous factors including the type and amount of grass roots in the soil, the adherence of soil particles to each other and the adherence of the soil particles to the grass roots in the sod slab. In general care must be taken to ensure that integrity of the unrolled sod slab remains intact during the transport so that the sod slab can be laid down at the work site.

One method for lifting unrolled sod slabs uses a set of clamps that grasp the blades of grasses to transfer the sod slab in an unrolled condition. Such a device is shown in U.S. Patent application Publication U.S. 2005/0000704. In some cases it may be preferable to roll a sod slab into a cylindrical sod roll as the roll geometry increases the integrity of the sod for handling as well as allowing hooks or the like for piercing the sod roll to enable one to lift the sod roll. However, if the hooks are not properly applied to a roll of sod the sod roll can unwind or the sod can tear making it difficult to handle. Thus both methods of handling sod slabs either in a rolled condition or an unrolled condition are known in the art.

In contrast to the prior art devices and methods of moving sod the present invention includes a sod lift mechanism that enables one to lift and transport a sod slab from the sod field to the work site whether the sod slab is in a flat condition or in a rolled condition while maintaining the integrity of the sod slab. The various embodiments of the sod handling apparatus described herein include an apparatus for holding sod with a pressure differential across the sod slab, a sod transport mechanism; a sod carriage, a sod bed positioning system, a bump bed for lifting sod from a conveyor as well as use of such sod handling apparatus in sod machines such as sod harvesters. In addition the inventions include novel methods with one method including a method of machine stacking sod to maintain the integrity of a sod stack. The embodiments for transferring sod are shown and described with respect to a sod harvester although each of the various embodiments of the sod handling apparatus shown and described can be used in equipment other than sod harvesters.

SUMMARY OF THE INVENTION

Briefly, the invention includes a sod handling method and a sod handling apparatus. In one embodiment the sod handling apparatus uses a pressure differential to hold a sod slab during sod transfer, other embodiments include a sod lift member for lifting sod, a sod transport mechanism for moving sod; a sod carriage for transporting sod, a sod bed positioning system for stacking sod, a system and method for checking sod quality as well as an apparatus and method of machine stacking sod to maintain the integrity of a sod stack with each of the sod handling apparatus useable in a sod harvester.

BRIEF DESCRIPTION OF THE DRAWINGS

FIG. 1A is a top view of the sod transport mechanism of the sod harvester of FIG. 1;

FIG. 5E is a partial sectional view showing the sliding relation ship between the carriage displacement mechanism and the frame;

FIG. 6 is a rear view of the sod slab transport mechanism in the sod lifting condition;

FIG. 6A is a partial side view of the bump bed in the retracted condition;

DESCRIPTION OF THE PREFERRED EMBODIMENTS

Figure 1:
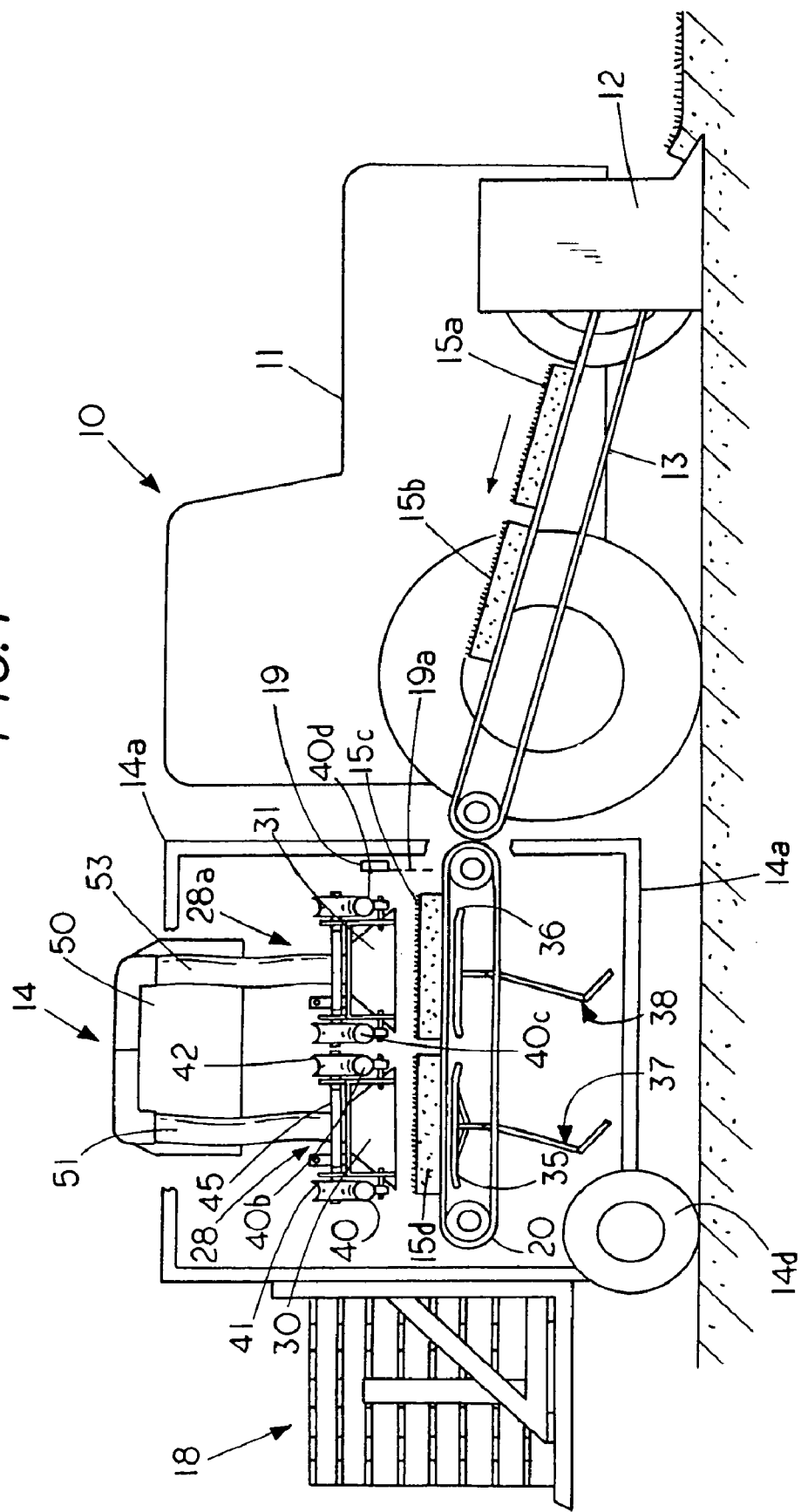
FIG. 1 is a side view of a sod harvester for cutting and stacking sod slabs for delivery to a work site.
Figure 2:
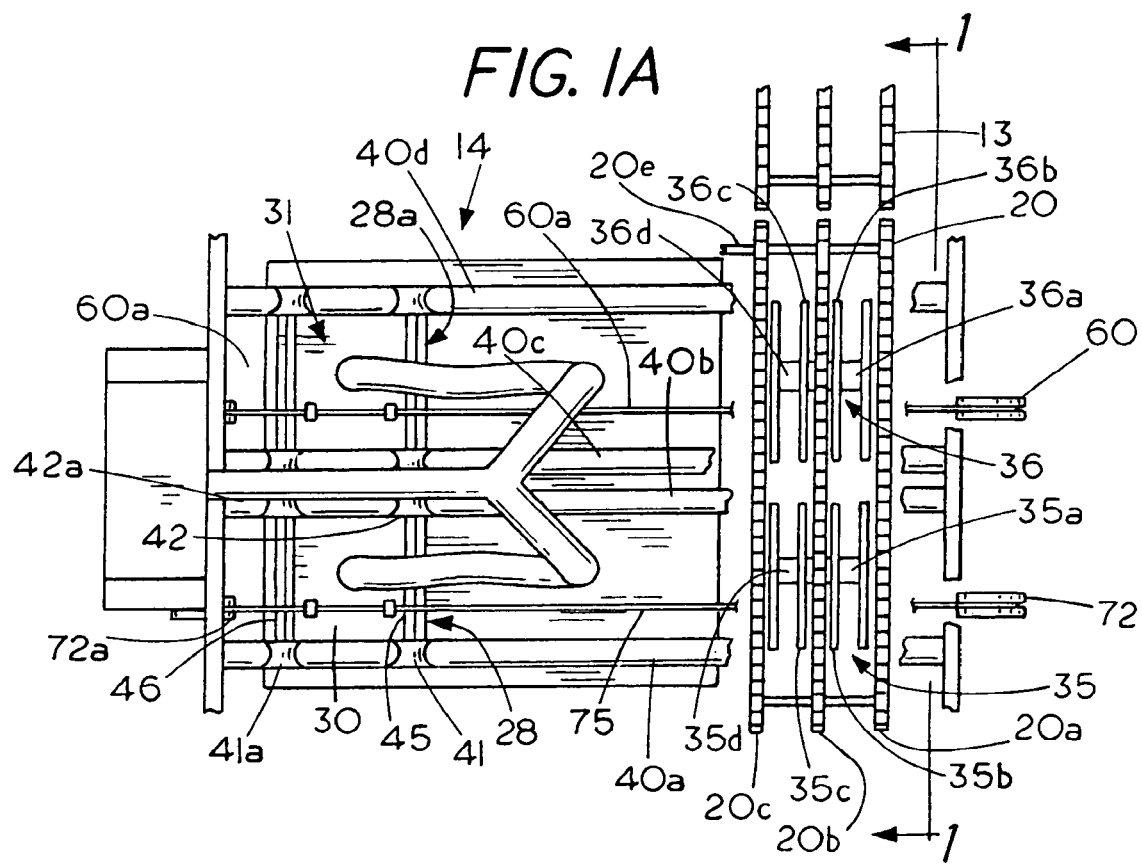
FIG. 2 is a partial side view of the sod harvester of FIG. 1 showing a sod slab being elevated to a suction housing for transport of the sod slab to a pallet.
Figure 3:
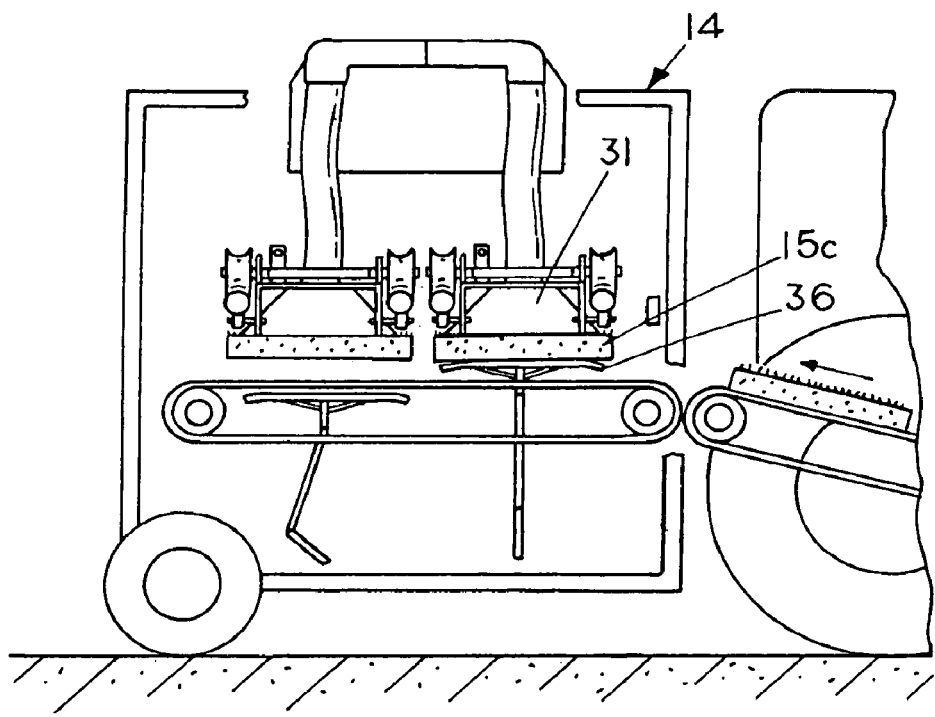
FIG. 3 is a partial side view of the sod harvester of FIG. 1 showing a further sod slab being elevated to a suction housing for transport of the sod slab to a pallet.

FIG. 1 is a side view of a sod harvester 10 including an agricultural tractor 11. In general, the sod harvester 10 cuts sod slabs, removes sod slabs from a conveyor, transfers and stacks the sod slabs on a pallet while simultaneously monitoring sod slab quality and the sod receiving position of the pallet.

The sod harvester 10 includes a power source such as an agricultural tractor 11 which is used to power a sod cutting mechanism 12 and an elevator 13 for elevating the cut sod slabs from the sod cutting mechanism 12 to a sod transfer mechanism 14. Sod cutting mechanism 12 and the sod elevator 13 for elevating slabs of sod in a sod harvester which is either self propelled or pulled by an agricultural tractor are known in the art and are not described herein.

After the sod harvester cuts the sod slabs from the sod field the sod slabs are delivered to a conveyor 20 in the sod transfer mechanism 14 where a sod quality monitoring system including a sensor 19 determines if a sod slab is of proper sod quality. If the sod slab is of proper sod quality the sod transfer mechanism 14 transfers the sod slab to a pallet. The pallet, when loaded with sod, can be transferred to a truck by a fork lift and the pallet of sod can then be transferred to a work site.

FIG. 1 shows a side view of the sod transport mechanism 14 for transferring sod slabs within the sod harvester 10. The sod transport mechanism 14 includes a conveyor 20 for transporting sod slabs to a position proximate a sod lift mechanism 37 and 38. Conveyor 20 is shown supporting a sod slab 15c and a sod slab 15d and in a condition to receive a sod slab 15b and a sod slab 15a which are on sod elevator 13.

A wheel 14d, which can be hydraulic raised or lowered, supports the rear of sod transport mechanism 14 with the front of the sod transfer mechanism 14 supported on the agricultural tractor 11. If desired, the sod transfer mechanism 14 could be cantileverly mounted or integrally mounted on an agricultural tractor or the like as well as used in other sod handling operations independent of sod harvester 10. A pallet storage and feed mechanism 18 as well as an air suction pump 50 can be included on sod transfer mechanism 14 when the sod transfer mechanism 14 is used as part of a sod harvester.

A reference to FIG. 1 (side view) and FIG. 1A (top view) shows the sod conveyor 20 comprises a set of three spaced apart rotating chains or flexible belts 20a, 20b and 20c that are driven from the power source such as the PTO of agricultural tractor 11. Conveyor 20 receives the sod slabs from the elevator 13 and a sod lift mechanism 37 including a bump bed 35 and a sod lift mechanism 37 including a bump bed 36 located below the top surface of the conveyor 20 elevates sod slabs from the conveyer 20 to a sod slab support member where the sod slab support member includes a suction housing 30 to support the sod slab thereunder through generation of a pressure differential across the sod slab. In the embodiment shown a second sod slab support member comprising a second suction housing 31 can be used to support a further sod slab.

A carriage 28 in conjunction with the suction housing 30 transfers the sod slab from conveyor 20 to a sod bed such as a sod pallet. The sod slabs, which are deposited on the sod bed can be maintained at a proper sod drop distance by a sod positioning system 21, shown in isolated view in FIG. 10a, to ensure that the sod slabs can be stacked properly. A second carriage 28a, which is identical to the carriage 28 can transfer a sod slab from conveyor 20 to the sod pallet at the same time that sod carriage 28 is transferring a sod slab from conveyor 20 to the sod pallet. As carriage 28 and carriage 28a are identical carriage 28 is not described herein. A carriage shift system 29, FIG. 5A, provides for lateral displacement of the sod carriage 28 and sod carriage 28a to enable one to position sod slabs in two transverse different directions.

Figure 10:
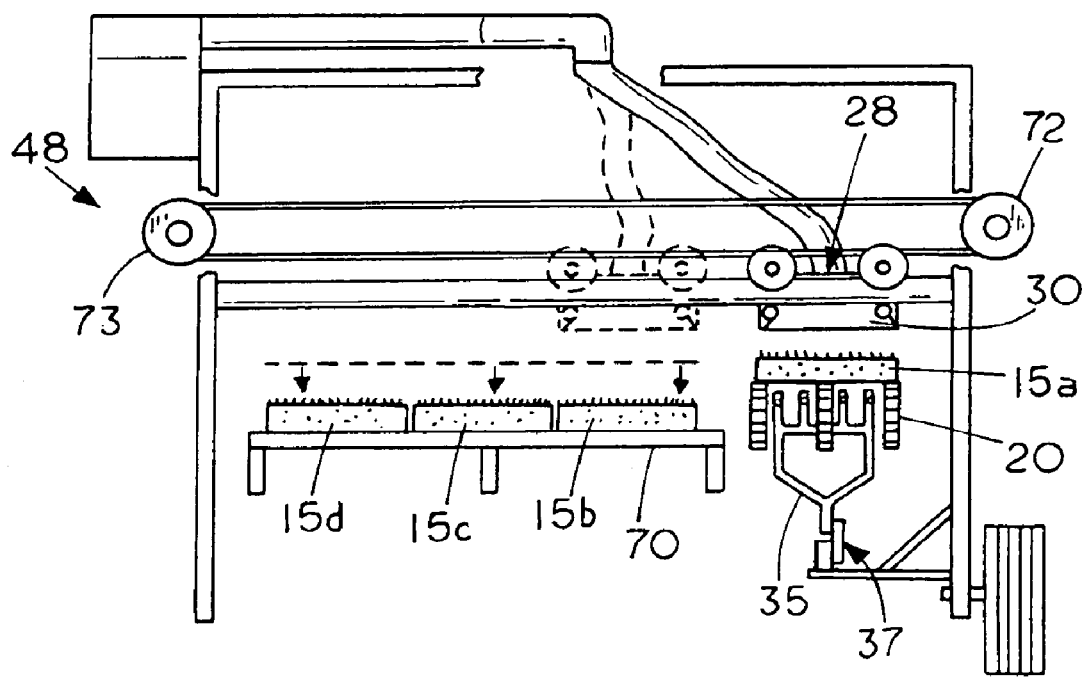
FIG. 10 is a rear view of the sod slab transport mechanism with the pallet moving downward in response to the slabs of sod on the pallet to enable a further layer of sod slabs to be stacked on top of the sod slabs on the pallet.
Figure 10A:
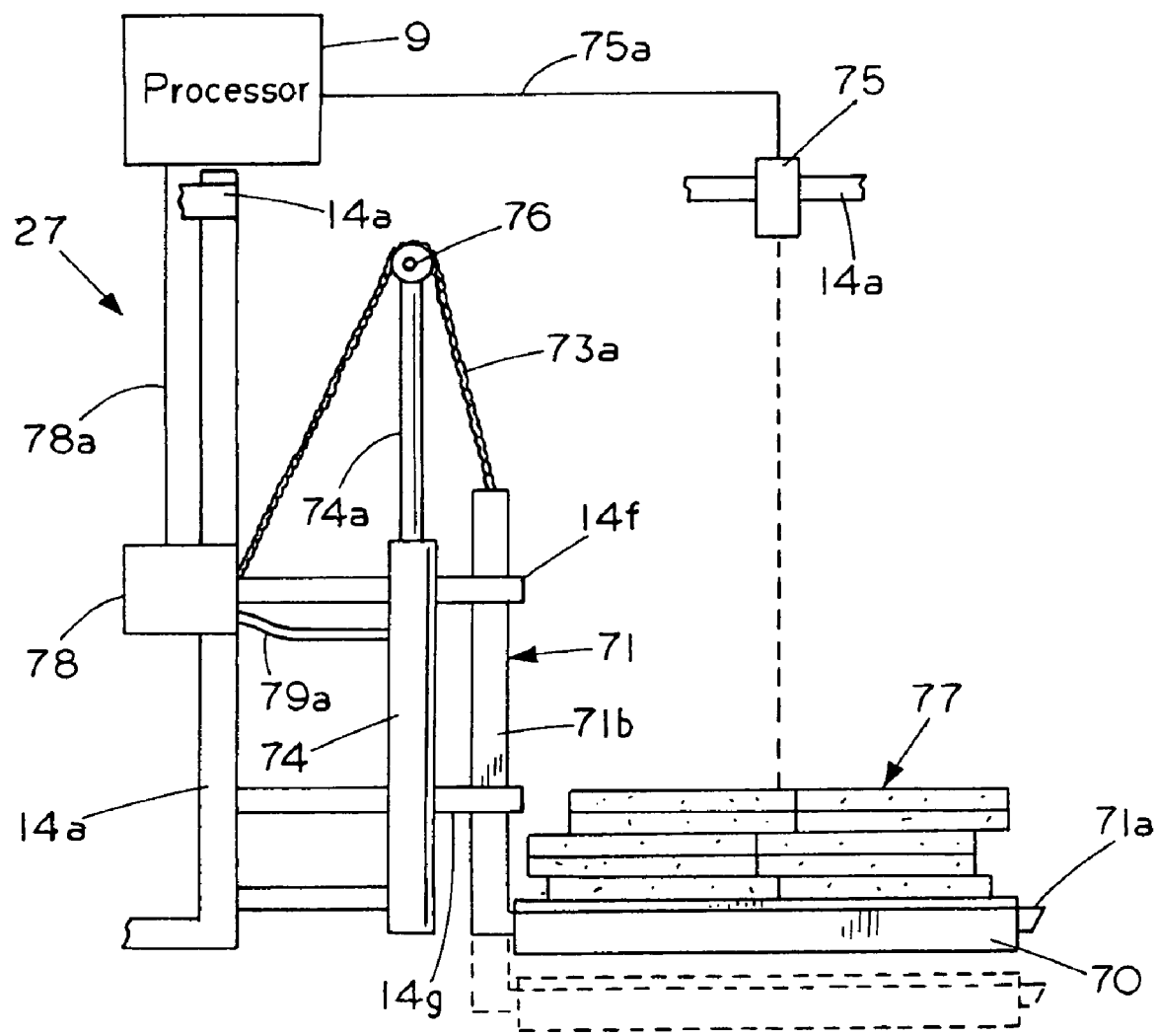
FIG. 10A is an isolated partial view of the sod bed positioning system for maintaining a drop distance.

Thus, the sod harvester 10 includes a sod transfer mechanism 14 with the sod transfer mechanism 14 (shown in FIG. 1) including a sod quality monitor 19, a sod conveyor 20, a sod lift mechanism 37, 38, including bump beds 35, 36 (shown in isolated view in FIG. 6A to FIG. 6C), sod slab support members or pick up heads including suction housings 30 and 31 (shown in isolated view in FIG. 11-FIG. 13), a carriage mechanism including a cable driven sod carriage 28, 28a (shown in isolated view in FIG. 4A), a carriage shift system 29 (shown in isolated view in FIG. 5A-FIG. 5E) and a sod positioning system 21 (shown in isolated view in FIG. 10A)

In the embodiment shown in FIG. 1 a first sod slab 15c in a flat or unrolled condition is supported by conveyor 20 with sod slab 15c located beneath suction housing 31 and a second sod slab 15d also in the unrolled condition, which is also supported by conveyor 20, located beneath suction housing 30. Counter clock wise rotation of conveyor 20 brings the sod slabs 15d and 15c to a lift position beneath suction housing 30 and suction housing 31. As the sod slabs 15d and 15c are carried by conveyor 20 they pass under a sod quality monitor or sensor 19, which is mounted to frame 14a. Sod quality sensor 19 is located above conveyor 20 and prior to the sod pickup hood or suction housing 31 and determines whether a sod slab is in a stackable condition by determining the distance from the sensor to the top of the sod slab on conveyor 20 by emitting an acoustical signal indicated by dashed line 19a. If the sod slab is of proper sod stacking quality the top of the sod slab will have a continuous surface, i.e. the sod slab will be of proper length and not contain any tears or gaps. However, if the sod slab has a discontinuous surface or if the sod slab is to short or to long the sod slab is not of proper quality for stacking. Thus, if the distance from the sensor 19 to the sod slab remains substantially constant over a given length of sod the sod slab can be considered of proper quality for stacking. A processor, not shown, can measure and compare the expected relative displacement of the conveyor 20 and the expected length of a signal from sensor 19, which would indicate a continuous sod surface. If the signals are within determined ranges the sod slab is allowed to pass through the sod transfer mechanism 14. In an alternative embodiment, the sod processor can measure the length of time that a sod slab carried by conveyor 20 is proximate the sod quality sensor 19 and compared the measured time to the length of time a sod slab in a stackable condition would be proximate the sod quality sensor 19. If the times are within determined ranges the sod slab is allowed to pass through the sod transfer mechanism 14. Thus, processor comparisons can be done on either a time mode or a displacement mode and can also be done on-the-go.

In a time mode with a sod slab below stacking quality, the processor sends a rejection signal rejecting the sod slab if the length of time of a continuous surface from sensor 19 exceeds or is less than the length of time from a sod slab with a continuous surface i.e. the time a sod slab in stackable condition would be proximate the sod sensor 19. In the displacement mode with a sod slab below stacking quality, the processor sends a rejection signal rejecting the sod slab based on expected displacement of the conveyor while the sod monitor 19 determines the distance from the sod slab to the sod monitor 19 is within the determined range.

In either case, the sod quality sensor 19, generates a fault signal through a processor (not shown) that interrupts the sod transfer process. The interruption can be done by suppressing a signal to sod lift mechanism 37 and 38 thereby preventing sod pickup from conveyor 20 if the sod slab thereon is not in a stackable condition. Consequently, if the sod slab is not of proper sod quality the step of rejecting the sod slab from the stacking process of harvester 10 comprises allowing the conveyor 20 to continue to rotate and allow the sod slab, which is lacking in stacking quality, to fall off the end of the conveyor 20. One can thus automatically perform the process of sod slab quality monitoring and sod slab rejection without having to interrupt the operation of the conveyer 20 or have an operator interrupt the operation of the sod transfer process.

Figure 4:
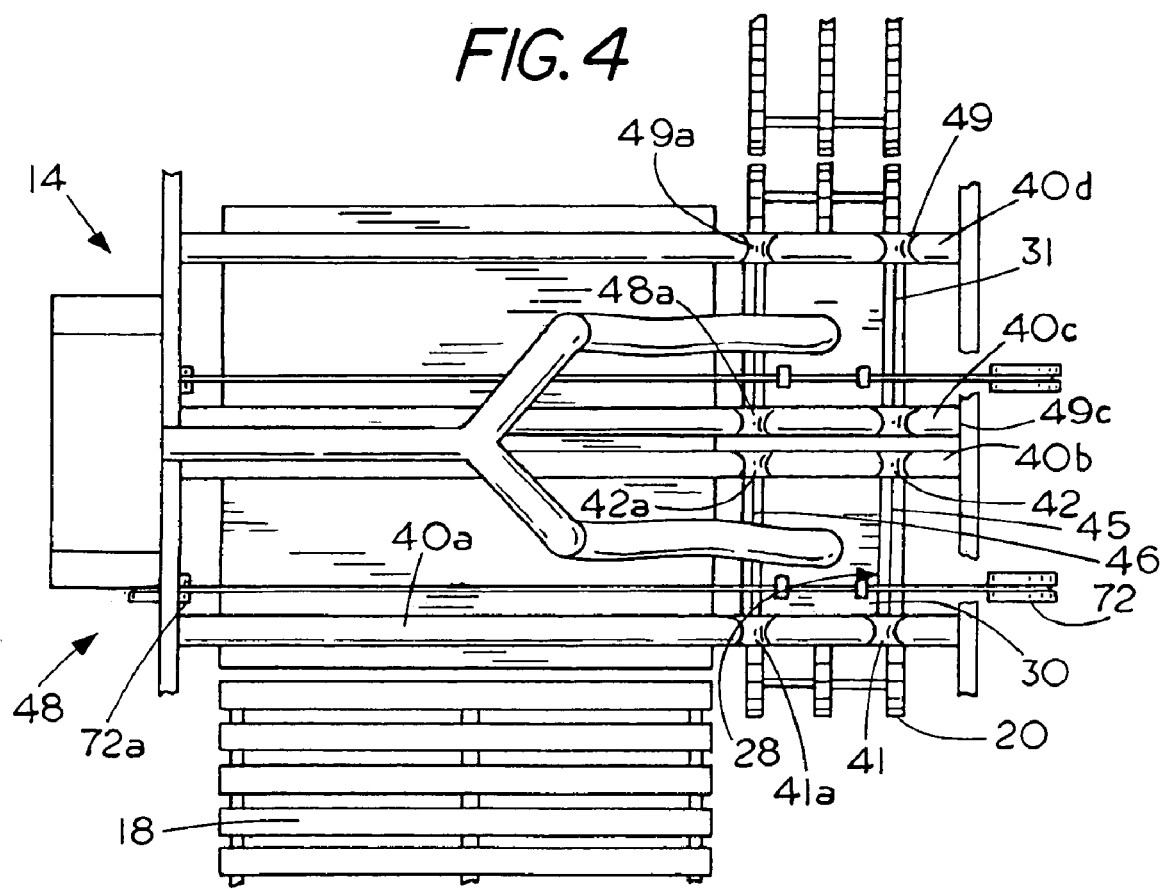
FIG. 4 is a top view of the sod slab transport mechanism of FIG. 2.

FIG. 1 and FIG. 4 show the sod carriers or sod slab support members comprising a first suction housing 30 and a second suction housing 31 located in a lift position above the individual sod slabs 15d and 15c on conveyor 20. The suction housing 30 is carried by a first carriage 28 having a set of wheels 41 and 41a on one side which are connected to wheels 42 and 42a by a cross member 45 and a cross member 46 that supports suction housing 30 thereon. The wheels 41 and 41a and wheels 42 and 42a roll on a track comprised of a first cylindrical rail 40a and a second cylindrical rail 40b. In order to maintain the wheels and the tracks in engagement under rough field harvesting conditions the wheels are provided with a U shaped circumferential groove so that the wheels can be maintained on the tracks as the wheels move back and forth on the track rails 40a and 40b carrying the suction housing 30 from a lift position shown in FIG. 4 to the various sod drop positions shown in FIG. 7, FIG. 8 and FIG. 9. Although a U-shape groove is used other shape tracks and rails can be used to maintain the wheels on the rails.

Figure 4A:
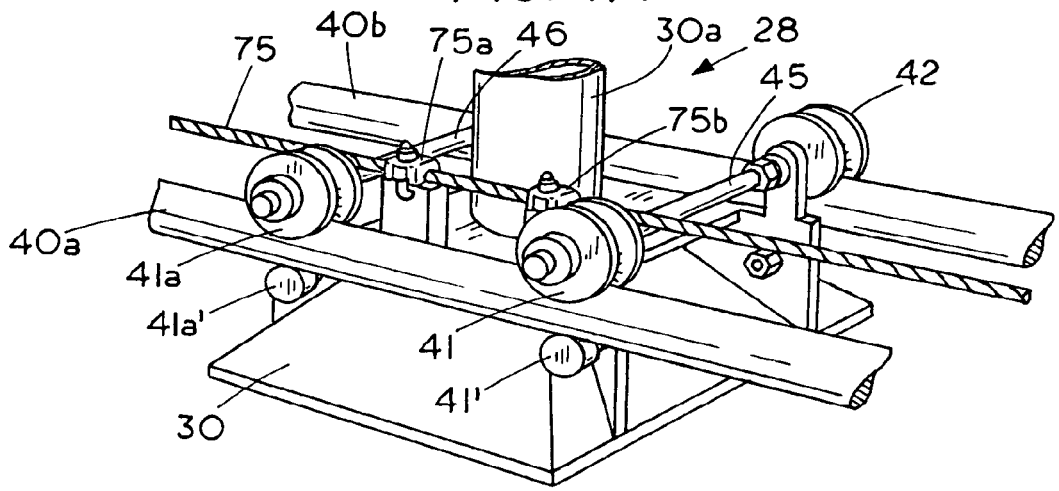
FIG. 4A is a perspective view of a sod carriage.

To further hold the carriage 28 on rail 40a a lower set of stops or wheels 41a' and 41' cooperate with the upper wheels 41a and 41 (see FIG. 4A). Similarly, an identical set of stops or wheels (not shown) located on the opposite side of carriage 28 hold the opposite side of carriage 28 on rail 40b.

Figure 14:
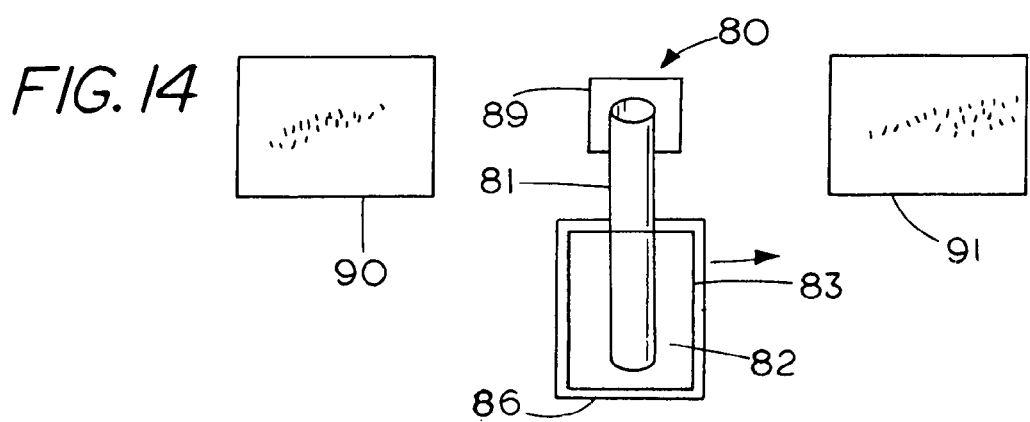
FIG. 14 is a top view of a system for transferring sod with a pivotable pressure lift.

FIG. 1A shows that located in a parallel condition to track rails 40a and 40b are identical track rails 40d and 40c which support a second sod carriage 28a and a second suction housing 31. As carriage 28 and suction housing 31 are identical to carriage 28 and suction housing 30 they are not described herein. If desired, the sod transfer mechanism 14 could use other methods of sod transfer besides tracks and wheels. For example, a pivotal or rotatable arm with a suction hood that picks and places sod slabs as illustrated in FIG. 14 could be used to move a sod slab from one location to another.

Figure 7:
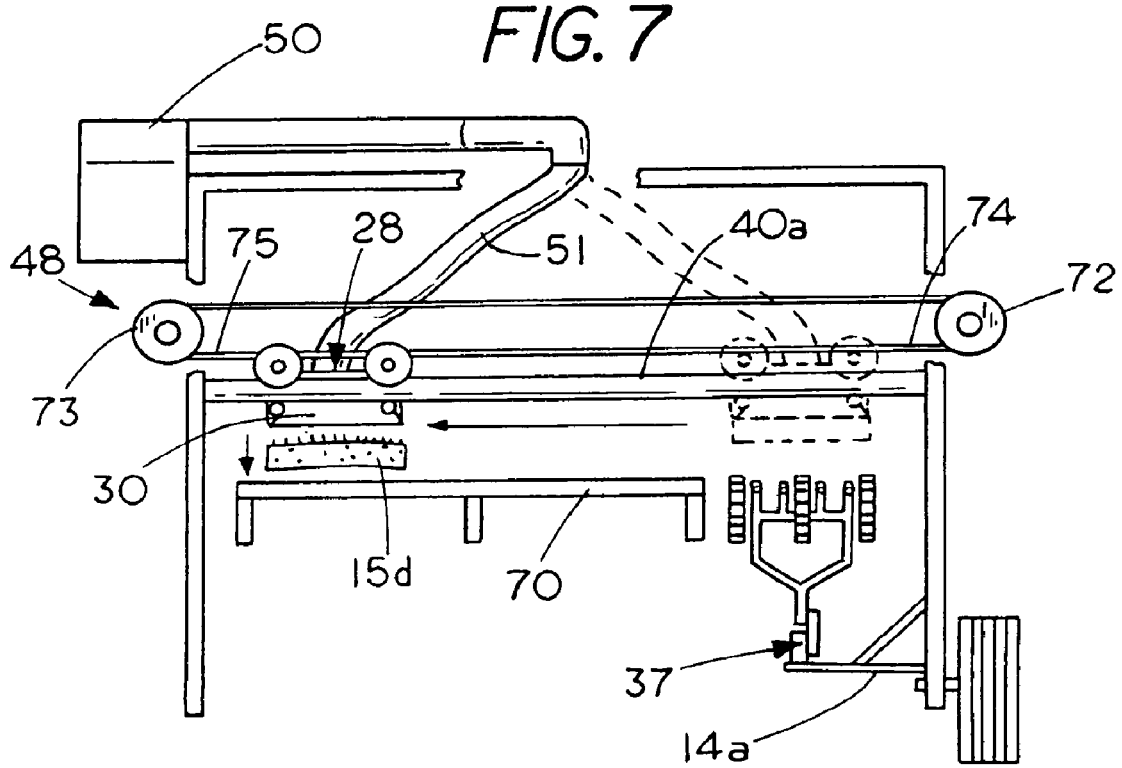
FIG. 7 is a rear view of the sod slab transport mechanism depositing a sod slab onto a pallet.
Figure 8:
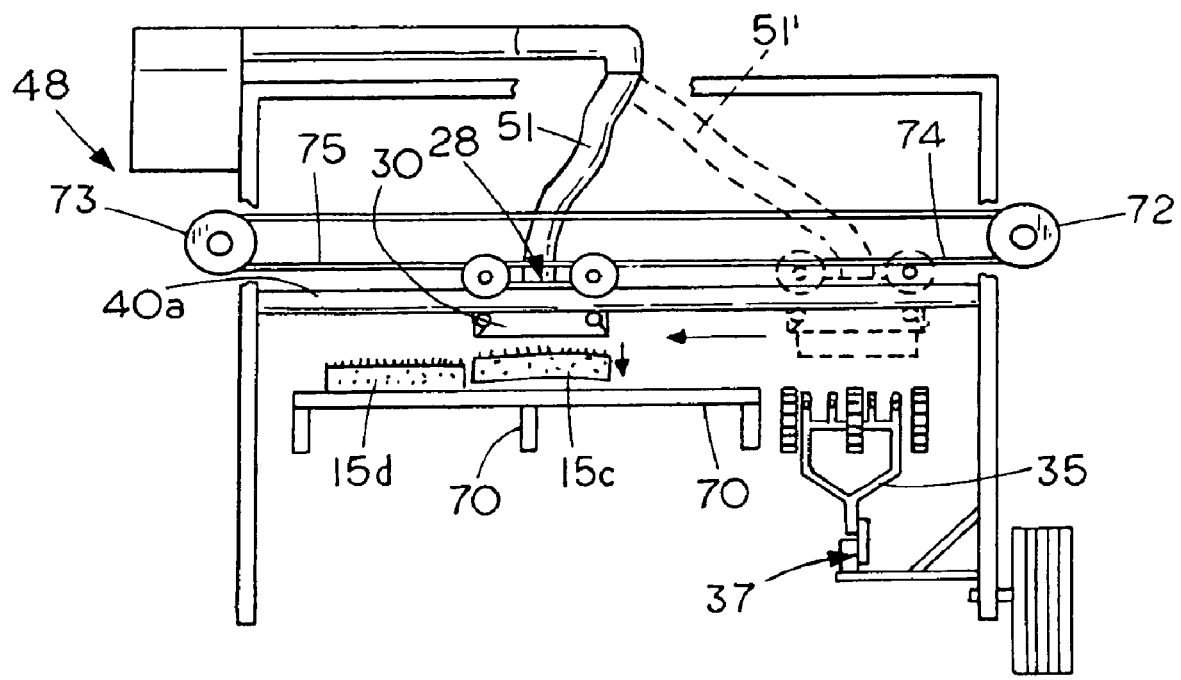
FIG. 8 is a rear view of the sod slab transport mechanism depositing a second sod slab onto a different position on a pallet.
Figure 9:
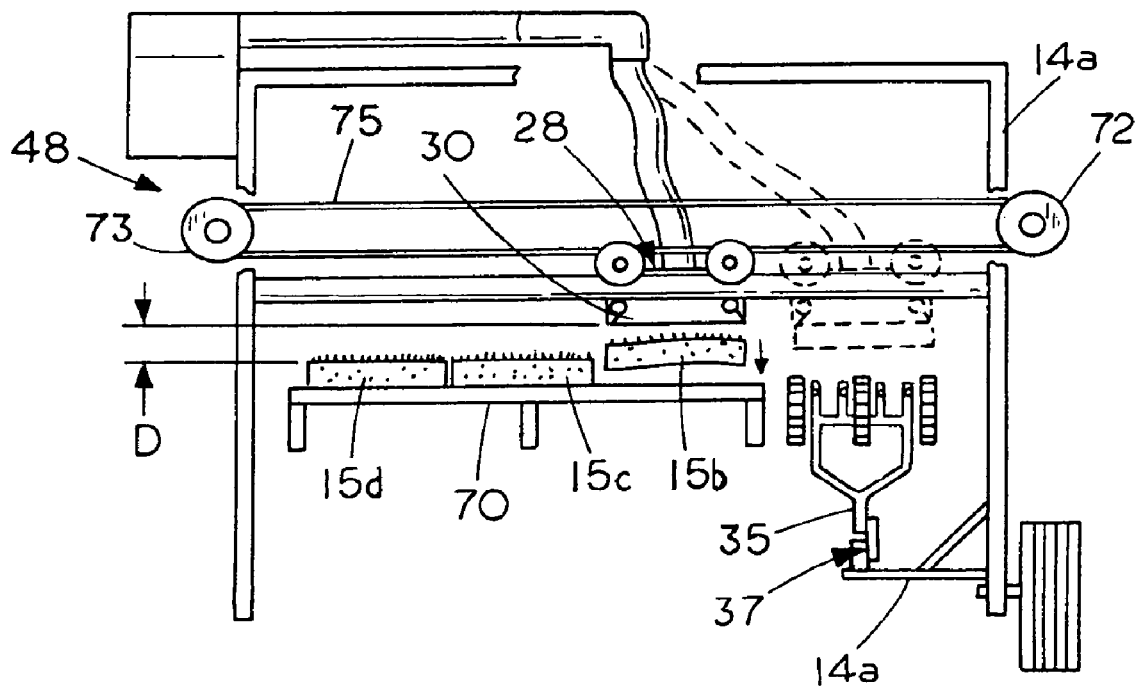
FIG. 9 is a rear view of the sod slab transport mechanism depositing a third sod slab onto a further position on a pallet.

Thus sod carriage 28 and the cable drive mechanism 48 as well as the sod carriage 28a and its cable drive mechanism provide for sod transfer from the sod conveyor 20 to selected drop off position above pallet 70 as illustrated in FIG. 7, FIG. 8 and FIG. 9 through a cable drive system 48 that includes, a cable, a cable drum, a pulley, a processor controlled hydraulic motor that rotates and stops the cable drum at proper positions.

The sod carriage 28, which is shown in isolated detail in FIG. 4A, fixedly connects to cable 75 through a first cable clamp 75a and a second cable clamp 75b. The fixed connections ensures that if the cable 75 is pulled one way or the other by rotating the cable drum in one direction the sod carriage 25 must also move. A conventional cable drum having a hydraulic motor, which is controlled by a processor (not shown) controls the position of sod carriage 28 along track rails 40a and 40b.

Figure 4B:
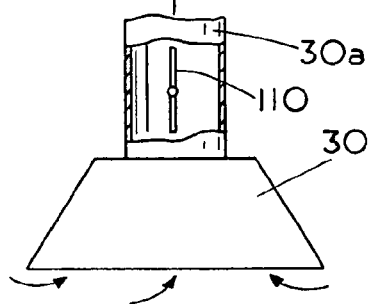
FIG. 4B is a partial cutaway view of the suction hood showing a butterfly shutoff valve in the open condition.
Figure 4D:
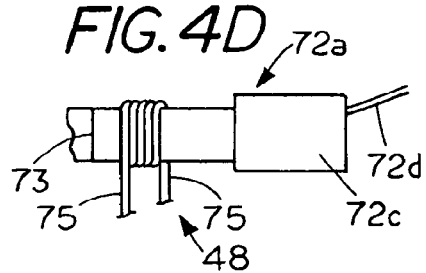
FIG. 4D is an isolated view of the cable drive mechanism including the cable drum for displacing the sod carriage.

FIG. 4D shows an isolated top view of a portion of the cable drive system 48 including cable drive member 72a having a rotatable cable drum 7 with a cable 75 wound therearound. A hydraulic motor 72c controlled through leads 72 rotates in one direction to move carriage 28 in a first direction and in the opposite direct to move carriage 28 in the opposite direction.

In order to position the carriage 28 at the proper position along the track rails the cable drive system 48 is powered by a hydraulic motor 72c located on one side of transport mechanism 14 and a free wheeling pulley 72 located on the opposite side of transport mechanism 14. Cable 75 is attached to carriage 28 by cable clamps 75a and 75b (FIG. 4) The hydraulic motor 72c allows carriage 28 to be moved to and fro on the track rails 40b and 40a. That is, as cable 75 is wound around the top side of cable drum 73 the cable 75 is allowed to unwind from the opposite side of the cable drum 73 which allows for displacement of carriage 28. Thus, the carriage displacement can be precisely and quickly controlled by rotating the cable drum 73 in either direction. When the carriage 28 needs to be moved in the opposite direction the reverse occurs, namely, cable 75 rotates in an opposite direction. Thus, through suitable rotational control of the cable drum one can quickly position the carriage 28 and consequently the suction housing 30 carried thereon at the proper position for either sod slab pick up or sod slab drop off. Through use of a cable drum that simultaneously winds and unwinds the cable 75 remains in a taut condition one minimize hysteresis in the positioning of the sod carriage 28.

While the preferred embodiment comprises a cable mechanism with a cable drum to displace carriage 28 other carriage displacement mechanisms are envisioned such as a motor driven cog wheel on the carriage with a corresponding cog track for one or both of the rails. In either event the sod carriage 28 can be positioned in the proper position along the track rails for sod slab pickup or drop-off.

The carriage and rails for moving the suction housing 30 in the sod transfer mechanism 14 is shown in end view in FIG. 1 and in top view of FIG. 1A.

FIG. 4B shows an isolated view carriage 28 carries the suction housing 30 thereon with the suction pressure generated in housing 30 and controllable by a butterfly valve 101 located in suction housing neck 30a. FIG. 4B shows the butterfly valve 110 in the open condition with air being drawing into suction hood or suction housing 30. The suction housing neck 30a connects to vacuum pump 50 though a flexible conduit 51 (see FIG. 1). The flexible conduit 51 allows one to move the carriage 28 along track rails 40a and 40b while maintaining the continuous suction power to suction housing 30.

Figure 4C:
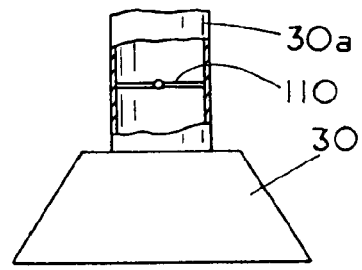
FIG. 4C is a partial cutaway view of the suction hood showing a butterfly shutoff valve in the closed condition.

FIG. 4C shows the suction housing 30 thereon with the butterfly valve 110 in the closed condition in neck 30a. In this condition the lack of suction pressure which is used to maintain a sod slab on the suction housing 30 causes the sod slab to fall from hood 3—because of the inherent porous nature of the sod slabs, thus causing a sod slab held on housing 30 to be dropped onto a sod bed. While dependent on sod conditions one can maintain a sod slab on the sod carriage by maintaining suction pressure on the sod slab proximate the suction housing 30 and can release the sod slab from the suction housing 30 by closing the butterfly valve 110.

With the embodiment and method shown the sod slabs 15c and 15d can be elevated in an unrolled condition from conveyor 20 which brings the sod slabs 15c and 15d to a sod lift position immediately below the sod suction housings 30 and 31. In this position a sod engagement step can take place between the suction housings and the sod slabs through bump beds in the sod lift mechanisms.

In the sod engagement step the sod suction housing 30 and the sod slab 15d are brought into engagement or close proximity with each other to enable a pressure differential across the sod slab 15d to generate a force sufficient to support the sod slab 15d thereunder as the sod suction housing 30 is moved about on track rails 40a and 40b. Similarly, the sod suction housing 31 and the sod slab 15c are brought into engagement or close proximity with each other to enable a pressure differential across the sod slab 15c to generate a force sufficient to support the sod slab 15c proximate suction housing 31 as the sod suction housing 31 is moved about on track rails 40c and 40d.

The suction of suction housing 30 and suction housing 31 is obtained by a suction from a vacuum pump 50 mounted on the sod transfer mechanism 14 that draws air through the suction housing or suction hoods 30 and 31. Pump 50 can have its own independent power source or can be powered from the agricultural tractor 11. A first flexible hose 51 extends from pump 50 to suction housing 30 and a second flexible hose 53 extends from pump 50 to suction housing 31. The flexible hoses allow the suction housing 30 and 31 to move in the sod transport mechanism while still maintaining a suction pressure that supports a sod slab thereunder. The suction housings 30 and 31 are identical to each other and are described in greater detail in FIG. 11 to FIG. 13.

Figure 13:
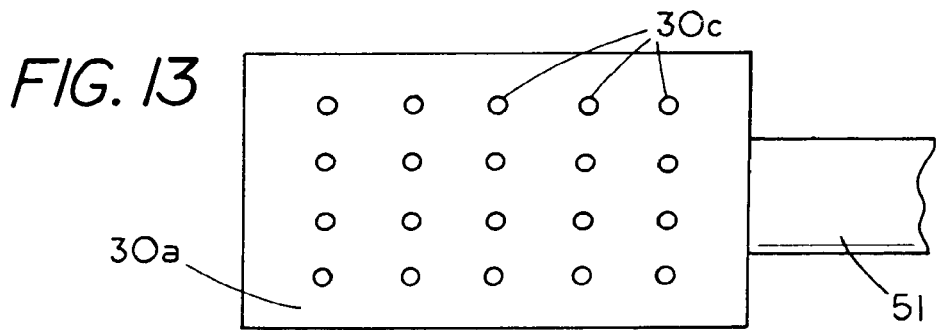
FIG. 13 is a bottom view of the lift plate shown a plurality of holes or fluid ports therein for flow of air therethrough.

FIG. 13 shows a bottom view of lift plate 30a that is located on the underside of suction hood 30. Lift plate 30a includes a set of spaced apart holes 30c that are in fluid communication with a plenum chamber 30b (see FIG. 11). As air is continually pulled through the holes or fluid ports 30c it creates a static and dynamic pressure differential across the sod slab 15d which can hold the sod slab thereon without sacrificing the integrity of the sod slab.

Figure 11:
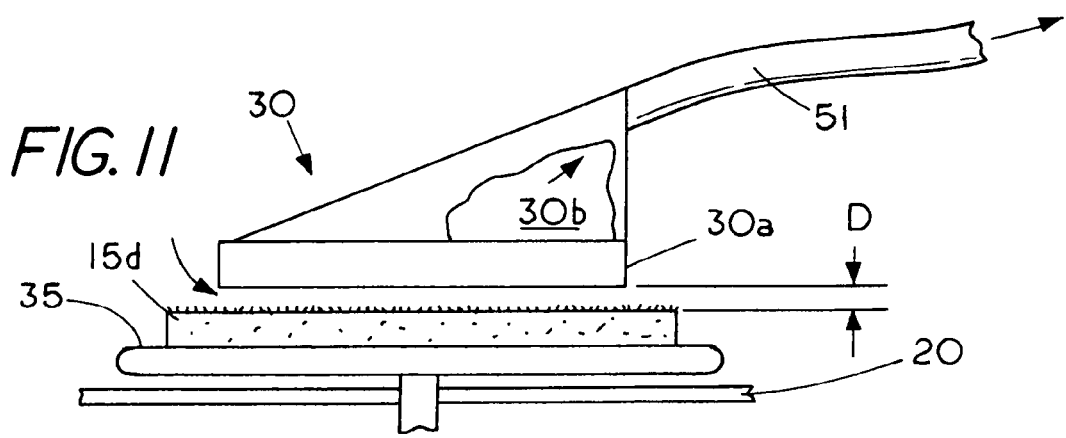
FIG. 11 is a side view of a pressure lift device comprising a suction housing positioned over a sod slab.

FIG. 11 shows a partial cutaway side view of sod slab 15d positioned on a support surface comprising bump bed 35 which extends through and above the top support surface of conveyor 20. Sod slab 15d contains soil on the underside and grass on the top side. The suction housing 30 includes a sod lift plate 30a having a plurality of openings therein. Suction housing 30 includes having a plenum chamber 30b is shown positioned above sod lift plate 30a. A flexible hose 51 connects to an air suction pump (see FIG. 1). In the position shown the sod lift plate 30a is spaced a distance D from the top of sod slab 15d with air being drawn through sod lift plate 30a. In this condition the sod slab 15d remains on the support surface 35 as the air flows (as indicated by arrows) over the sod slab 15d and into the plenum chamber 30b in housing 30.

Figure 12:
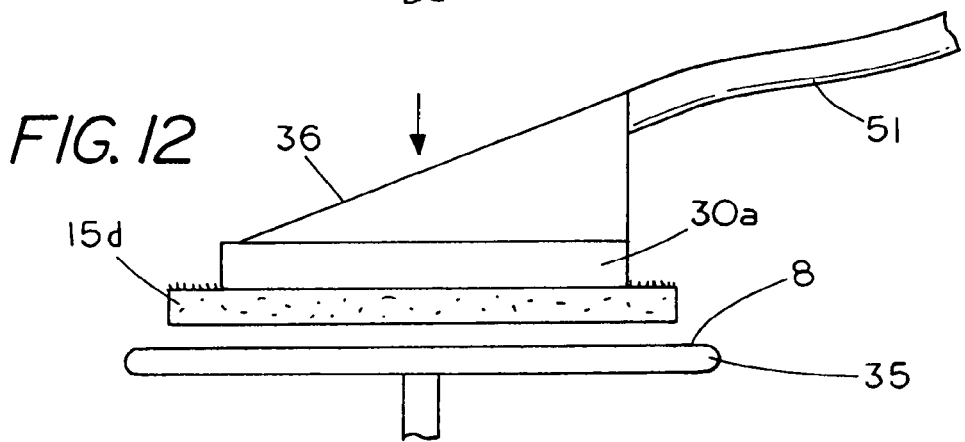
FIG. 12 is a side view of the pressure lift device of FIG. 11 holding a sod slab on the underside of the suction housing.

FIG. 12 illustrates what occurs when either the suction from the source is increased or as the sod lift plate 30a is brought proximate the sod slab 15d. In this embodiment the sod slab 15d is supported against the sod lift plate 30 solely by the presence of a pressure differential across the sod slab 15d. That is the pressure in housing 30 is less than atmospheric pressure with the differential pressure being sufficient to provide a lifting force greater than the weight of the sod slab. Although the sod slab contains soil on the bottom side and grass shoots on the top side and is porous to air it has been found that the generation of a lower pressure (i.e. below atmospheric pressure) in the plenum chamber 30b by connecting the housing 30 to a suction or vacuum pump is sufficient to engage and support a sod slab 15d during a sod transfer either through static or dynamic pressure on the sod slab without the aid of mechanical hooks or lifts. That is, air can flow through the sod it can generates a fluid frictional force against the sod slab i.e. drag to generate a lift force and the static pressure differential across the sod also generates a force to hold the sod slab on the sod plate 30a. It has been found that by maintaining a pressure differential across the sod slab either through static or dynamic flow conditions such as when air is drawn through the sod slab enables one to lift and transfer a sod slab without disrupting the integrity of the sod slab. Thus, even though some soil or grass on the sod slab may be drawn into the plenum chamber 30b by suction the amount drawn therein is insufficient to upset the integrity of the sod slab. An incidental benefit is that if there is loose material on top of the sod slabs, such as grass clippings or unwanted weed seeds they are removed from the sod slab during the sod harvesting process by the suction pressure across the sod slab.

FIG. 14 shows a top view of an alternate embodiment of a sod transfer mechanism 80 which can be used in a sod transfer mechanism to either stack or unstack sod slabs. For example, the sod transfer mechanism 80 can be used to transfer a first stack of sod slabs 90 to a second set of sod slabs 91 with a rotatable sod slab transfer mechanism 80 positioned therebetween. The sod slab transfer mechanism 80 includes a rotatable base 89 with a arm, 81 connected to suction housing 82. A sod lift plate 83 located having a sod slab 86 carried thereon by the suction pressure generated in housing 82. In operation the stack of sod slabs 90 is to be transferred from the first position to a second position represented by the stack of sod slabs 91. To do so the sod slab lift mechanism 80 is rotated until the sod lift plate 83 is over the stack of sod slabs 90. The application of a suction pressure picks the sod slab 86 form the stack of sod slabs 90 with the suction housing 82. Housing 82 is shown in the mid rotational position to transfer the sod slab 86 to a position over the stack of sod slabs 91. In this embodiment the sod slab sod 86 is transferring from one stack 90 to another stack though the use of the pressure differential generated in the suction housing 82 in conjunction with the rotation of suction through rotatable base 89.

While the sod suction housing have been shown and described in a sod transfer mechanism in a sod harvester the suction housing can also be used in other sod handling equipment. For example, one can unload a pallet of sod and lay the sod on a work site using the sod transfer mechanism with the suction housing. In this operation one could mount the movable housing 89 on a device such as a front end loader. The suction housing 82 can then be placed over a stack of sod slabs and one-by-one transfer the sod slabs from the sod pallet to the field without a user having to lift and place the sod slab in position.

Figure 15:
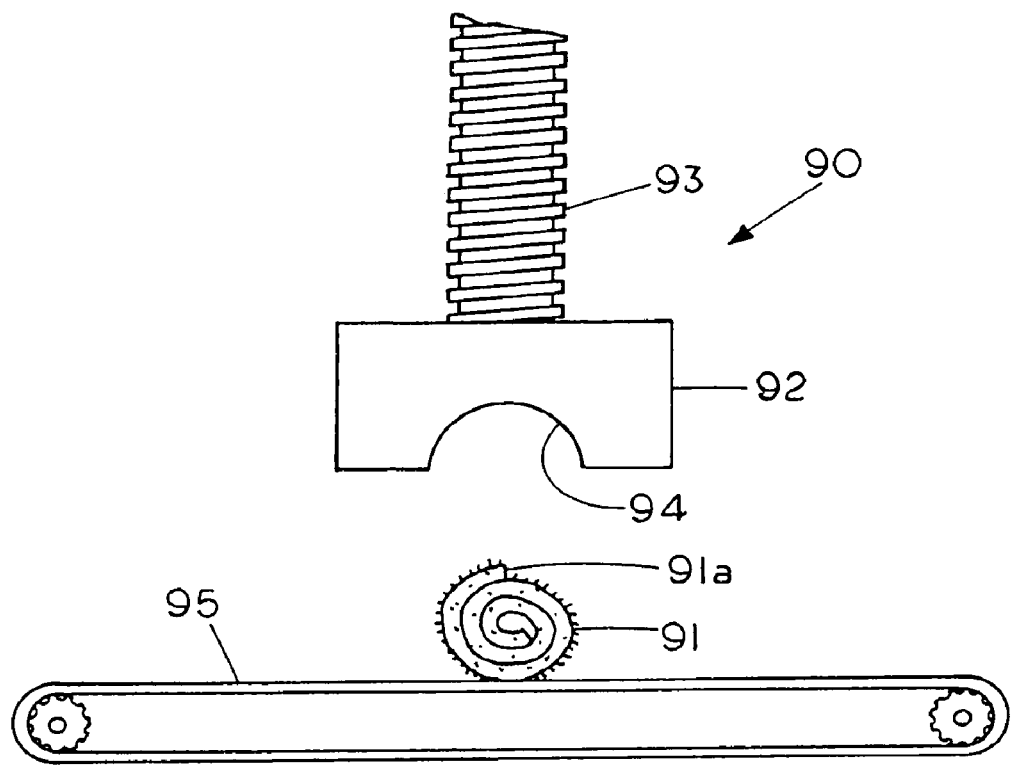
FIG. 15 is a side view of an alternate embodiment of a suction housing having a curved lift plate about to engage a sod slab in a roll form.
Figure 16:
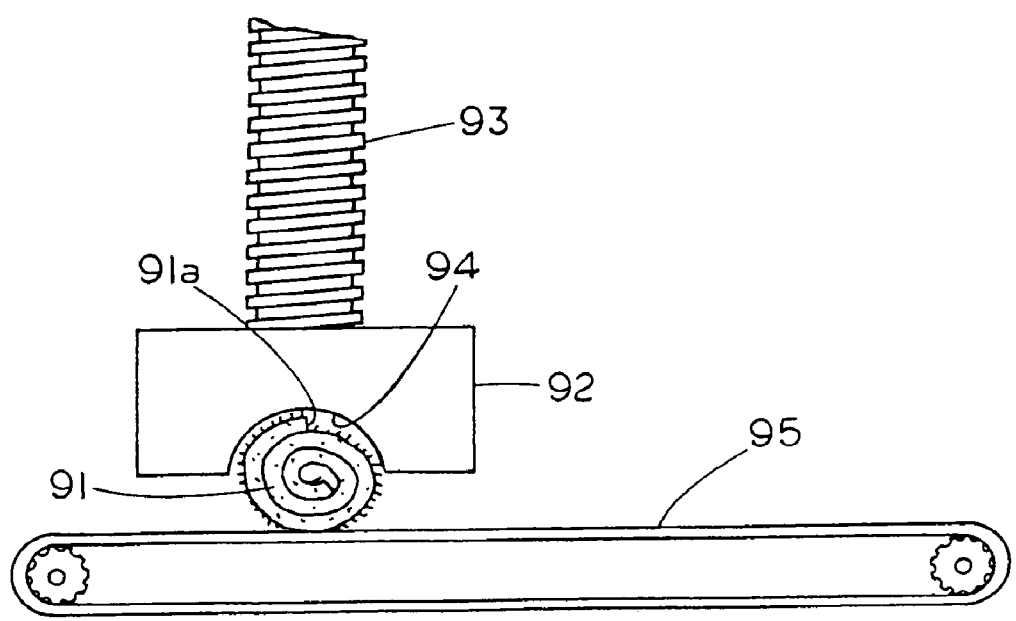
FIG. 16 is a side view of the suction housing of FIG. 15 in lifting engagement with the sod slab in a roll form.

While our sod handler apparatus have been shown and described in relation to the lift and transferring a flat sod slab i.e. in an unrolled condition the present invention can also be used to transfer sod in other forms. For example, FIG. 15 and FIG. 16 illustrate a sod transfer mechanism 90 for transferring a sod roll 91 using a suction housing 92. In the embodiment shown the sod transfer mechanism 90 includes a suction housing 92 with a flexible conduit 93 that connects to a suction pump or the like. Instead of having a flat lift plate the suction housing 92 contains a curved lift plate 94 having a set of air ports therein identical to the ports 30c in lift plate 30a. In the position shown in FIG. 15 the suction housing is positioned above sod roll 91 which rests on a conveyor 95.

A reference to FIG. 16 shows the suction housing 92 lowered around the cylindrical sod roll 91 with the lift plate 94 conforming to the shape of the sod roll 91. By application of suction pressure to housing 92 one can lift the sod roll 91 for transport. In this procedure it is preferred that the end 91a of the sod roll 91 be on the top side so as to avoid unraveling of the sod roll as the sod roll 91 is lifted by the pressure differential generated across the sod roll 91.

Referring to FIG. 1, although two sod slabs 15d and 15c are shown on conveyor 20 the sod engagement process with each of the sod slabs can be achieved independently for each sod slab. In addition, to minimize the suction generated, and hence the power required, in the suction housing 30 and 31 each of the sod slabs can be elevated into a sod engagement position through bump beds 35, 36 that elevates the sod slab from the moving conveyor 20 to a condition of engagement or close proximate to the suction housing 30 or 31 where the suction pressure becomes sufficiently great so as to support the sod slab thereunder thereby bringing the suction housing into the transport condition. In the transport condition the suction housing 30 holds a sod slab proximate the suction housing 30 though a pressure differential across the sod slab or through a fluid flow through the sod slab or both. That is the sod slab can be supported without impairing the integrity of the sod slab and without the aid of mechanical hooks or clamps either by the pressure differential forces generated by the pressure differential from the top side to the bottom side of the sod slab or by the fluid friction i.e. drag as air flows through the sod slab and into the suction housing.

To illustrate the process of engagement between the suction housing 30 and 31 while minimizing power usage reference should be made to FIG. 1A which shows a top view of the sod bump beds 35 and 36. Bump bed 35 includes a set of four parallel spaced rails 35a, 35b, 35c and 35d for lifting the sod slabs to a sod transport condition. Located between chains 20a and 20b is a first set of rails 35a and 35b and located between chains 20b and 20c is a second set of rails 35c and 35d for engaging the underside of a sod slab that is carried by conveyor 20. Similarly, bump bed 36 includes a set of four parallel spaced rails 36a, 36b, 36c and 36d for lifting the sod slabs to a sod transport condition. Located between chains 20a and 20b is a first set of rails 36a and 36b and located between chains 20b and 20c is a second set of rails 36c and 36d for engaging the underside of a sod slab that is carried by conveyor 20. The rails are spaced sufficiently close so as to distribute a lifting force over the underside of a sod slab sufficient to lift the sod slab without creating a localized pressure point that might cause rupture or separation of the sod slab.

Figure 5:
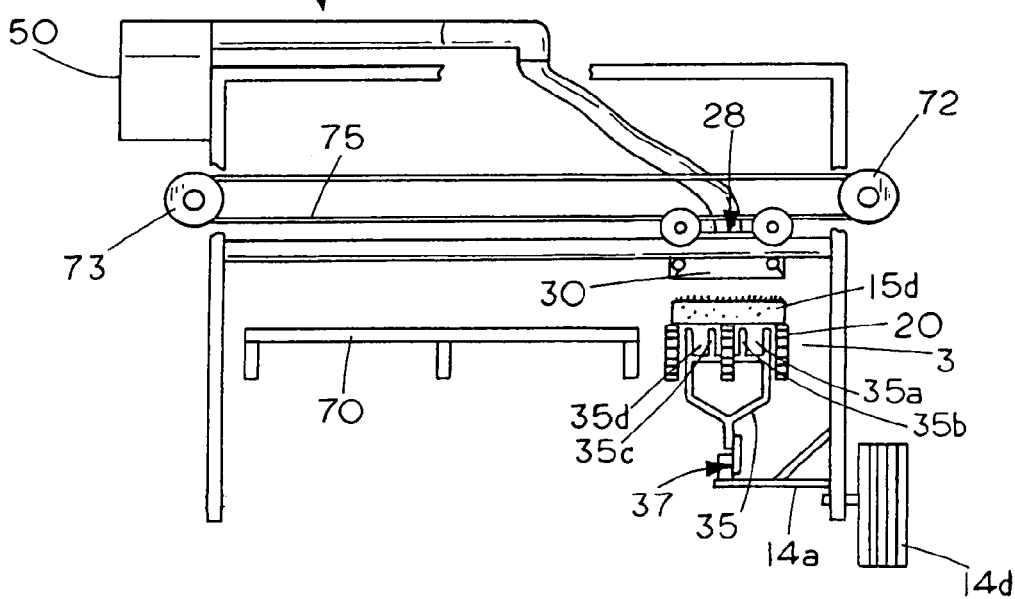
FIG. 5 is a rear view of the sod slab transport mechanism of FIG. 2.
Figure 5A:
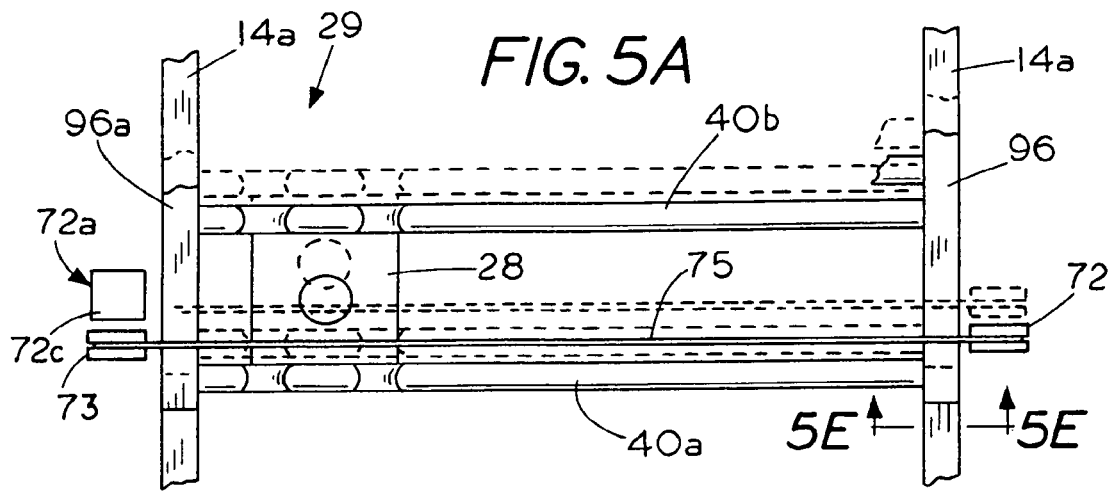
FIG. 5A is an isolated top view of the carriage displacement mechanism.

The bump bed 35 is further revealed in FIG. 5 which shows a rear view of the sod transport mechanism 14. A lift member 37 supports bump bed 35 with bump bed rails 35a, 35b, 35c and 35d located on the underside of sod slab 15d. The bump bed rails are shown in a pre sod lifting condition on the underside of sod slab 15d. Bump bed 35 is vertically displaceable through the lift member 37

In order to appreciate the operation of the bump beds reference should be made to FIG. 1A and FIG. 6A to FIG. 6C. FIG. 1A shows a top view of the conveyor 20, wherein the suction housing 30 for lifting the sod slab has been retracted to provide a clear view of the relationship of conveyor 20 to bump bed rails 35a, 35b, 35c, 35d of bump bed 35 and bump bed rails 36a, 36b, 36c and 36d of bump bed 36. Conveyor 20 includes a set of three rotatable chains 20a, 20b and 20c that are rotatingly driven through a drive shaft 20e which is connected to a suitable power source. Each of the rotatable chains 20a, 20b and 20c are spaced from each other in a parallel relationship and are driven at the same speed to transport a sod slab from the elevator 13. In operation conveyor 20 receives a sod slab from the elevator 13 and carries the sod slab to a sod engagement position beneath the suction housing. Each of the three rotatable chains 20a, 20b and 20c are spaced from each other with a spacing sufficient close so as to support and carry a sod slab thereon without destroying the integrity of the sod slab thereon.

FIG. 1A shows the rails of the first bump bed 35 and the rails of second bump bed 36 spaced between the rotatable chains of conveyor 20. A feature of the bump beds is that they can provide for on-the-go elevation of a sod slab from the conveyor 20 to a condition beneath the suction housing since they operate independently of the conveyor 20. That is, the conveyor 20 can continue moving while the bump beds extend through the space between the rotatable chains to lift the sod slab from the conveyor 20 and bring the sod slab to a condition of engagement or close proximity with the suction housings. The bump beds 35 and 36 can reduce the power consumption of the suction housing since the sod slabs can be brought proximate the suction housing to allow suction pressure in the suction housing to draw the sod slab against the suction housing. That is, the farther away the suction housing is from an object the more air needs to be pumped to generate the pressure differential to lift the sod slab. In addition, the bump bed 35 can be operated independently of bump bed 36 which allows one of the sod slabs to be brought into engagement with the suction housing while another suction housing is dropping a sod slab on a pallet. As a result, if desired, the power consumption can be controlled by staggering the operation of the sod lifting and sod dropping operation.

Figure 6B:
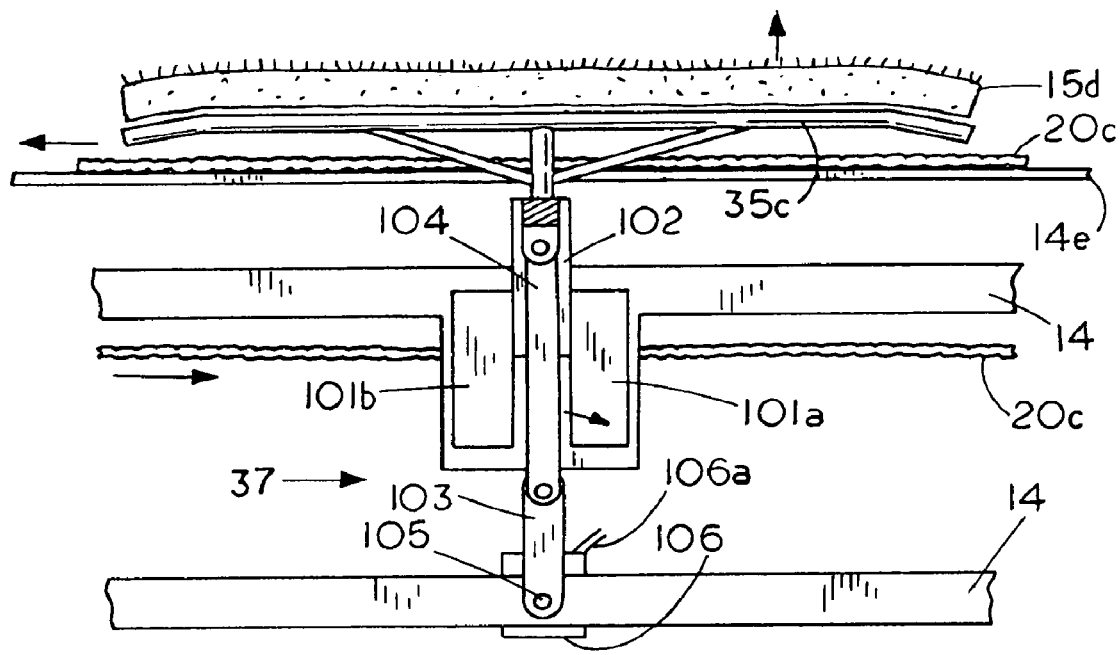
FIG. 6B shows the bump bed of FIG. 6A in the sod lifting condition.
Figure 6C:
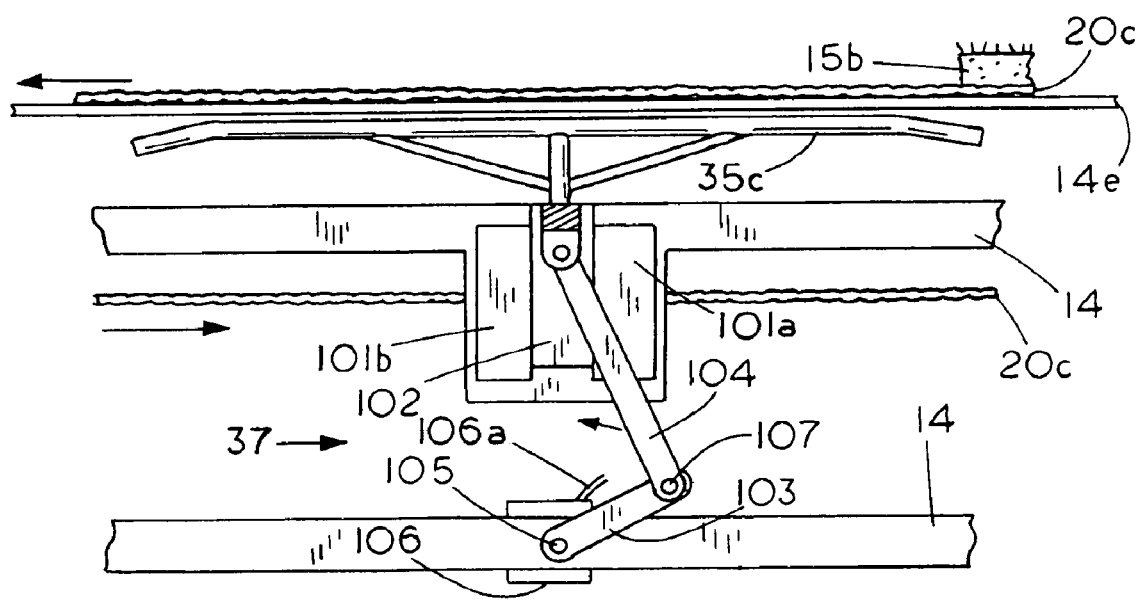
FIG. 6c shows the bump bed of FIG. 6A in the retracted condition.

A reference to FIG. 6A to FIG. 6C shows the sod lift mechanism 37 and illustrates the cyclic operation of the bump bed 35 in lifting a sod slab 15$d$ to engagement or close proximity to suction housing 30 and then returning to a ready condition for lifting a further sod slab. To illustrate the lifting process only bump bed rail 35$c$ is shown, however, the lifting operation of bump bed rails 35$a$, 35$b$ and 35$d$ work in condition with bump bed rail 35$c$.

FIG. 6A shows the bump bed 35 in the non-sod lifting condition or retracted condition. In this condition the lift mechanism 37, which is supported on frame member 14, is in the retracted condition. In the retracted condition the sod slab 15$d$ is carried by conveyor 20 and the bump bed rail 35$c$ is in a ready condition beneath the underside of sod slab 15$d$.

FIG. 6B shows the bump bed 35 in the lift condition. In the lift condition the lift mechanism 37 raises bump bed 35 to bring the bump bed rail 35$c$ into engagement with the underside of sod slab 15$d$. Once engagement between the sod slab underside and the bump bed rail is established the continued upward movement of the bump bed 35 lifts the sod slab 15$d$ off the conveyor 20. Lifting the sod slab 15$d$ off the conveyor ceases the lateral displacement of the sod slab 15$d$ caused by the conveyor without having to stop the conveyor 20. However, if desired the conveyor 20 could be stopped to stop the forward motion of the sod slab. As the sod slab 15$d$ is brought proximate or in engagement with the suction housing 30 the suction generated within the suction housing 30 supports the sod slab 15$d$ on the underside of the suction housing 30 whereupon the bump bed 35 retracts to the ready condition shown in FIG. 6C. Depending on the composition of the sod slab the sod slab is held on the suction housing 30 by the pressure differential forces across the sod slab or the fluid friction forces produced by drag as air flows through the sod slab or by a combination of the pressure differential forces and the fluid friction forces. In either event the sod slab can be lifted and transported by establishing a pressure differential across the sod slab.

FIG. 6A to FIG. 6C is an isolated sectional view of a sod transfer mechanism for moving a sod slab from one location to another with the sod transfer mechanism including bump bed rail 35$c$, which is a part of bump bed 35, and a portion of one of the conveyor belts 20$c$, which is a part of conveyor 20, in conjunction with a lift mechanism 37 for elevating and lowering bump bed 35$c$. FIG. 6A shows the conveyor belt 20$c$ carrying a sod slab 15$d$ in the direction indicated by the arrow. The bump bed rail 35$c$ is in the retracted condition. The drive mechanism for bump bed 35$c$ includes a power source 106 such as a hydraulic motor that is mounted on frame 14$a$ with the motor 106 operable from a remote processor through control leads 106$a$. Mounted to frame 14 is a drive shaft 105 that connects to a first end of first link 103. The opposite end of link 103 connects to a second link 104 through a pivot pin 107 that allows link 103 to pivot with respect to link 103. The opposite end of link 104 connects to slider 102 which is held in position by slide blocks 101$a$ and 101$b$ which are located in a parallel spaced condition on opposite sides of slider 102 to laterally confine slider 102 therebetween. The result is that a rotary motion of drive shaft 105 imparts linear displacement of slider 102 along a lift axis parallel to the slider blocks 101$a$ and 101$b$.

FIG. 6A shows sod slab 15$d$ on top of conveyer belt 20$c$ with conveyor belt 20$c$ supported by a conveyor slide rail 14$e$. In this condition the top of the bump bed 35$c$ is located beneath the conveyor belt 20$c$ and the sod 15$d$ can be carried by conveyor belt 20 without interference by bump bed rail 35$c$. When the sod slab 15$d$ is in the proper position for pickup a signal is sent to power source 106 to rotate drive shaft 105. FIG. 6A shows the drive shaft 105 midway through its cycle and FIG. 6C shows the drive shaft at the end of its cycle.

FIG. 6B shows that in the middle of the cycle the bump bed 35$c$ lifts the sod slab 15$d$ off the conveyor belt 20$c$ while the conveyer belt 20$c$ continues to rotate. Once the sod slab is at the zenith of its position the top pick up mechanism, (which can be hood 20 FIG. 1) lifts the sod slab 15$d$ and carries the sod slab 15$d$ to a sod stack.

FIG. 6C shows the end of the cycle with the link 103 and 104 located at an angle to each other but in a mirror position of that shown in FIG. 6A. In the position shown in FIG. 6C the bump bed rail 35$c$ is again located below conveyor belt 20$c$ and does not interfere with a sod slab 15$b$ which is being carried by conveyer 20$c$. Thus the bump bed rail 35$c$ provides an on-the-go lifting of the sod slab from the conveyer 20$c$. Consequently, one need not stop the conveyor 20 to lift the sod slab 15$d$ therefrom since the bump bed 35 with the bump bed rails 35$a$, 35$b$, 35$c$ and 35$d$ are positioned between the conveyor belts 20$a$, 20$b$ and 20$c$ and can elevate sod slabs from between the conveyor belts 20$a$, 20$b$ and 20$c$ (see FIG. 1A) while the conveyor 20 maintains its motion.

To lift the sod slab 15$b$ from the conveyor the cycle is repeated with the link mechanism 103 and 107 rotating from the position shown in FIG. 6C to the position shown in FIG. 6A by a counterclockwise rotation of the link 103.

Thus the invention includes a sod transfer system wherein conveyor 20 has a movable top sod support surface 20$c'$ for carrying a sod slab 15$d$, a bump bed 35 which is normally positioned below the movable top sod support surface 20$c'$ and a lift mechanism 37 for elevating the bump bed 35 and a lift mechanism 38 for elevating the bump bed 36 above top sod support surface 20$c'$ to thereby lift a sod slab free of the top support surface 20$c'$ with the lift mechanisms 37 and 38 if desired, to provide on-the-go elevation a sod slab from the conveyor to a sod pickup head located above the bump bed.

FIG. 7 illustrates the movement or displacement of a sod slab 15$d$ while using the suction housing 30 to hold the sod slab 15$d$ during sod transfer. In operation, a suction housing carriage 28 carries the sod slab 15$d$ to a position over a pallet 70. When the desired position above pallet 70 is reached the suction pressure can be reduced by the butterfly valve (see FIG. 4C) which allows the sod slab 15$d$ to fall onto pallet 70. Note, that the carriage 28 moves on track rails with the flexible hose 51 permitting the carriage 28 and the suction housing 30 to move from the position shown in FIG. 6 to the position shown in FIG. 7 while still maintaining the suction pressure on the sod slab 15$c$.

FIG. 8 illustrates the sod transfer step wherein a sod slab 15$c$ is placed alongside the first sod slab 15$d$ on pallet 70 through the action of carriage 28 and suction hood 30. That is, the carriage 28 is positioned so that the sod slab 15$c$ is above pallet 70 and in a position that allows sod slab 15$c$ to fall next to the sod slab 15$d$. At this point the butterfly valve (see FIG. 4C) is closed allowing the sod slab to fall free of suction hood 30.

FIG. 9 illustrates the sod transfer step with carriage 28 positioned at a third location along the track rail 40$a$ to allow sod slab 15$b$ to be deposited proximate side sod slab 15$c$ on pallet 70. That is the carriage 28 is positionable so as to carry the sod slab 15$b$ to a position on pallet 70 where the sod slab 15$b$ can be dropped into position along side sod slab 15$c$ by releasing the suction pressure on housing 30. Thus the carriage 28 can be positioned along track rail 40$a$ using the cable drive system 48 to position the carriage 28 at various location so that the sod can be stacked on the pallet 70.

FIG. 10 shows the sod transfer step with carriage 28 suction housing 30 returned to a position over the conveyor 20 where a sod slab 15a on conveyor 20 is about to be lifted from the conveyor. The process can now be repeated with bump bar 35 lifting the sod slab 15a to a position wherein the suction generated in suction housing 30 is sufficient to hold the sod slab 15a thereon during the transfer of the sod slab 15a from one location to another.

FIG. 10 also shows that pallet 70 is lowered in response to placement of sod slabs 15d, 15b and 15c. This allows another row of sod slabs to be stacked on top of sod slabs 15d, 15b and 15c. Thus the present invention can in one continuous operation convey a sod slab to a position to be lifted, engage a sod slab by lifting the sod slab proximate a suction housing and then transfer the sod slab attached to the suction housing to a position where the sod slab can be stacked on a sod pallet. By repeating the process the sod slabs can be stacked on the pallet in a condition where they are ready to be transported to the work site using a fork lift and transport vehicle.

FIG. 10A shows an isolated partial schematic side view of the sod bed positioning system 27 that raises and lowers pallet 70 comprising a pallet 70 with a fork lift member 71 having a horizontal extending arms 71a that support pallet thereon and a vertical extending arm 71b that slides vertically upward and downward in guide members 14f and 14g that are attached to frame 14a. A power cylinder such as a hydraulic cylinder 74 is affixed to frame 14a with hydraulic cylinder 74 having an extendible ram 74a extending therefrom. Located at the end of ram 74a is a pulley 76 that engages the flexible member 73a, which comprises a link chain. Link chain 73a has a first end secured to frame 14a and a second end secures to the top end of arm 71b. A hydraulic hose 79a connects the power cylinder 74 to a controllable source of hydraulic fluid 78. Hydraulic fluid source 78 supplies hydraulic power through hydraulic hose 79a to the hydraulic cylinder 74. A lead 78a connect the processor 9 to the source of hydraulic fluid to control the delivery of hydraulic fluid to the hydraulic cylinder 74 and thereby control the displacement of extendible ram 74a.

Positioned above the sod slab stack 77 is a sonic transducer 75 that measures the distance (indicated by dashed line) from the sonic transducer 75, which is affixed to frame 14a, to the top of the sod stack 77. Sonic transducer 75 connects to processor 9 through lead 75a. Processor 9 is mounted on the sod harvester frame 14a.

In operation of the sod bed positioning system 27 the sonic sensor 75 sends a signal (indicated by the dashed line) to the top of the sod stack 77. The signal is used by the processor 9 to control the elevation of the sod pallet 70 and thereby control the sod drop distance D (see FIG. 9) from the bottom of the sod carriage 30 to the top of the sod slabs on the pallet. As the layers of sod accumulate on the pallet 70 the sod pallet 70 is periodically lowered by retracting extendible arm 74a which causes fork lift like member 71 to move from the solid position to the position indicated by the dashed lines. Thus, through measurement of the distance of the top of the sod slab from a fixed reference on the frame 14a of the sod harvester 10 one can move the sod pallet 70 progressively downward in response to the increased height of the sod stack thereby ensuring that the sod slabs, which are dropped thereon do not have to fall an excessive distance. By controlling the sod drop distance D of the sod stack from the bottom of the sod carriage one can control the impacting of the sod on the sod pallet. That is, by lowering the sod pallet 70 in response to adding layers of sod to the pallet one can assure that the sod carriage does not interfere with the layers of sod on the pallet 70. Similarly, by limiting the drop distance D one can ensure the sod slabs dropped on the pallet 70 are not dropped from a height that might cause the impact to effect the integrity of the stack as well as the quality of the sod slab.

Figure 17:
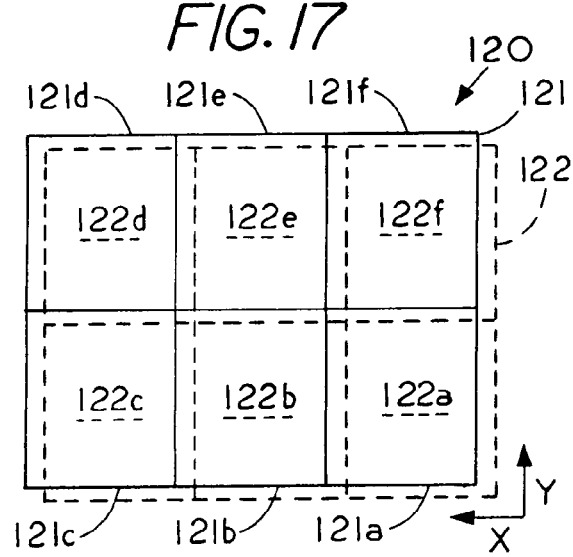
FIG. 17 is a top view of a top layer of sod in an offset relationship to a base layer of sod.

FIGS. 17-22 illustrate the machine stacking of sod slabs using the sod transfer mechanism 14. FIG. 17 shows a first layer of sod slabs that have been deposited by the sod carriages 28 and 28a. The first row of sod slabs, which are in a side by side condition are identified by reference numeral 121c, 121b and 121a and the second row of sod slabs which are in a side by side condition proximate the first row are sod slabs 121d, 121e and 121f. These two rows of sod slabs comprise the first layer of sod slabs 121 and are used herein as a reference layer to describe how subsequent layers of sod are stacked.

Figure 21:
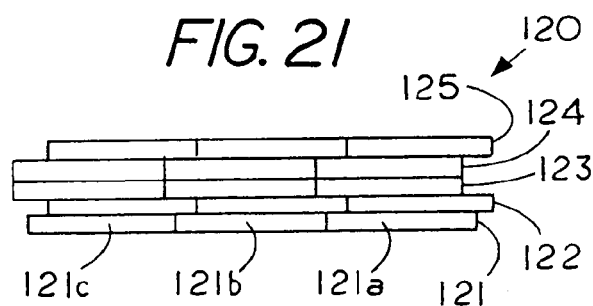
FIG. 21 is a side view of a layer of sod slabs in an offset condition.
Figure 22:
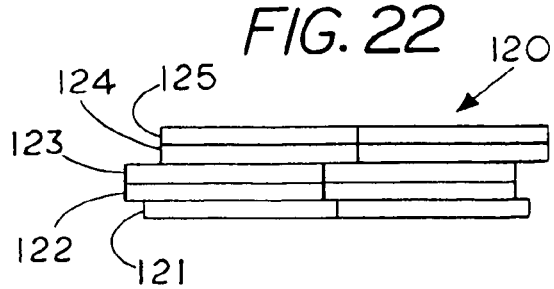
FIG. 22 is an end view of the layer of sod slabs in FIG. 21 in an offset condition.

FIG. 21 shows a front view of a sod stack 120 with sod layer 121 as the bottom layer and sod layers 122, 123, 124 and 125 located thereon. Similarly, FIG. 22 shows a side view of the sod stack 120 with sod layer 121 as the bottom layer and sod layers 122, 123, 124 and 125 located thereon.

FIG. 17 illustrates the sod slab positioning obtained through the machine stacking of sod slabs. Note, the sod slab layer 121 is laterally offset in two mutually perpendicular directions from the sod slab layer 122 to increase the integrity of the sod stack. That is, sod slabs 122a, 122b, 122c, 122c, 122d, 122e and 122f (shown in dashed lines) form the second layer 122 (see FIG. 21 and FIG. 22) with the individual sod slabs of sod slab layer 122 offset from the sod slabs in the first sod slab layer 121. This causes the junction of sod slabs on the first layer 121 to be covered by a sod slab on the second layer 122 thus providing a frictional force between the two layers of sod slabs that holds or binds the sod slabs in the first layer 121 and the sod slabs second layer 122 proximate each other.

Figure 18:
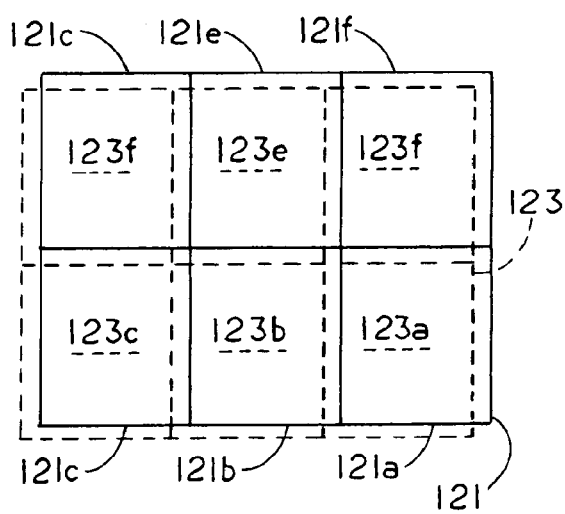
FIG. 18 is a top view of a further layer of sod in an offset relationship to the base layer of sod of FIG. 17.
Figure 19:
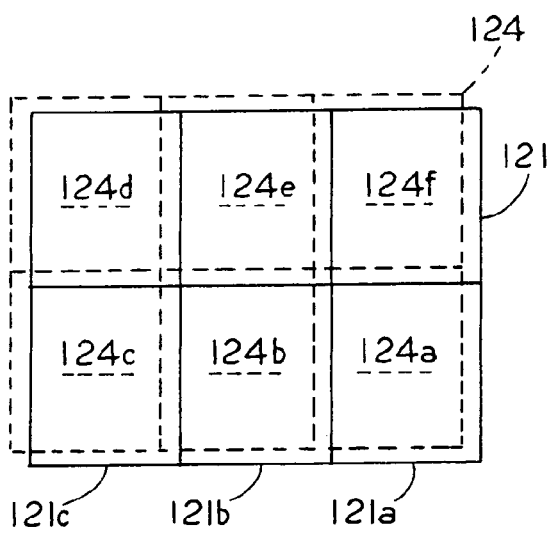
FIG. 19 is a top view of a further layer of sod in an offset relationship to the base layer of sod of FIG. 17.
Figure 20:
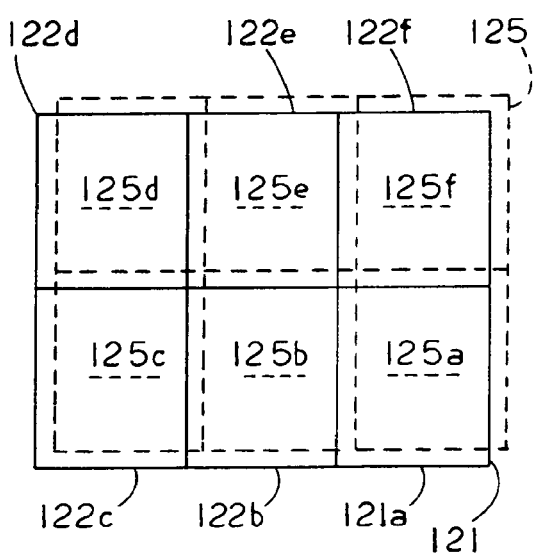
FIG. 20 is a top view of a further layer of sod in an offset relationship to the base layer of sod of FIG. 17.

A reference to FIG. 18 illustrates the first layer of sod 121 as the reference layer with the layer of sod 122 omitted in order to illustrate the offset stacking of sod slabs in layer 123 with reference to the position of the sod slabs in first layer 121. The third layer of sod slabs comprise a row of sod slabs 123a, 123b, 123c and a row of sod slabs 123d, 123e and 123f which make up the third layer of sod slabs 123. FIG. 21 and FIG. 22 show the position of the third layer of sod 123 with respect to the sod layer 122 and sod layer 121.

FIG. 18, which does not include sod layer 122, illustrates how sod slab layer 123 is laterally offset from the first layer 121 through displacement along the x axis but not along the y-axis. This shifting brings the intersections of sod layers 122 and 123 into an offset condition in the x axis as illustrated in FIG. 21.

FIG. 21 and FIG. 22 show the end view and side view of stack 120 with a fourth sod slab layer 124 located on top of sod slab layer 123 with the edges of the sod slab layers 124 and 123 in alignment in FIG. 21 but in misalignment or laterally offset in FIG. 22.

A reference to FIG. 19 again illustrates the first layer of sod 121 as the reference layer with the layer of sod 122 and 123 omitted in order to illustrate the offset stacking of sod slabs of sod layer 124 with reference to first layer 122. The fourth layer of sod 124 comprise a row of sod slab 124a, 124b, 124c and a row of sod slabs 124d, 124e and 124f which make up the fourth layer of sod slabs 124. The layer of sod slabs 124 have been offset in the y axis with respect to sod layer 121. FIG. 21 and FIG. 22 show the position of the fourth layer of sod 124 with respect to the sod layers 123, 122 and 121.

A reference to FIG. 20, which again illustrates the first layer of sod 121 as the reference layer with the layer of sod 122, 123 and 124 omitted in order to illustrate the offset stacking of sod slabs of fifth sod layer 125 with reference to first layer 121. The fifth layer of sod comprise a row of sod slab 125a, 125b, 125c and a row of sod slabs 125d, 125e and 125f which make up the fifth layer of sod slabs 125. The fifth layer of sod slabs 125 have been offset in the x axis. FIG. 21 and FIG. 22 show the position of the fifth layer of sod 125 with respect to the sod layers 124, 123, 122 and 121.

As can be seen from FIGS. 17-18 after the first layer of sod slabs is laid on a pallet or the like the second layer of sod slabs is laterally offset in both the x and y axis. Each successive layer of sod slabs is laterally offset in either the x axis or the y axis. The result is a sod stack 120 wherein the sod slabs in adjacent layers at least partially overlap each other to thereby create a frictional force that resist shifting of the sod slabs.

Thus one embodiment includes the method of machine stacking sod for transport comprising the steps of placing a first layer of sod slabs in a side-to-side position on a pallet to form a first layer of sod; and placing a second layer of sod slabs in a side-to-side position on top of the first layer of sod slabs with the second layer of sod slabs laterally offset from the first layer of sod slabs to thereby inhibit shifting a sod slab with respect to another sod slab. The process continues by laterally offsetting a further layer of sod with the further layer of sod slabs laterally offset in a direction opposite from the first layer of sod slabs and continuing to laterally offset an additional layer of sod by laterally offsetting the additional layer of sod in a direction normal to the first layer of sod slabs.

While the method shown and described with respect of FIG. 17 to FIG. 20 includes the stacking of sod slabs of similar size and shape. The machine stacking of sod slabs can also be done when sod slabs of different size and shape are interspersed with sod slabs of a conventional size and shape. In this method one could maintain stack integrity by laying a first layer of sod slabs of a first size in a side-to-side position on a support surface and then laying a second layer of sod slabs with at least one of the second layer of sod slabs having a size larger than the sod slabs in the first layer of sod on top of the first layer of sod slabs so that said at least one of the second layer of sod slabs overlaps at least two of the first layer of sod slabs to thereby inhibit shifting of the first layer with respect to the second layer.

While the method of machine stacking has been described in FIG. 17 to FIG. 22 the carriage shift system 29 for stacking the sod slabs in laterally offset layers is illustrated in FIGS. 5A, 5B, 5C, 5D and 5E.

FIG. 5A shows a top view of the carriage 28 with rails 40b and 40a mounted on a first runner 96 and a second runner 96a which can be displaced with respect to frame members 14a. FIG. 5E is an isolated view showing how rail 40a is secured to runner 96 by an extension 95. The extension 95 prevents axial displacement of rail 40a. The runner 96 can be slid along rail 14. As the attachment of each of the other rails are identical they are not described herein.

Figure 5B:
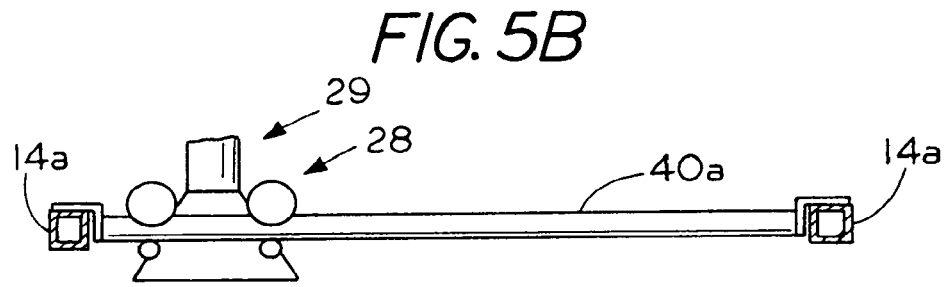
FIG. 5B is a side view of the carriage displacement mechanism sliding supported by the sod harvester frame.

FIG. 5B shows an isolated side view of the sod carriage 28 positioned between frame members 14a with the cable drive mechanism for the carriage omitted for clarity.

As a result of the sliding engagement of runners 96 with respect to frame 14a the carriage 28 and rails 40a and 40b can be laterally offset as a unit as shown by the dashed lines in FIG. 5A.

Figure 5C:
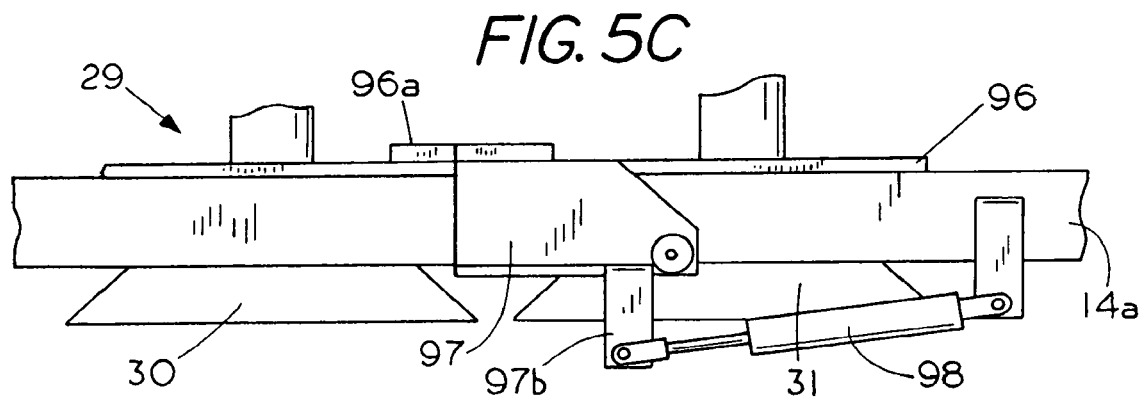
FIG. 5C is a partial front view of the carriage displacement mechanism in a first position.

FIG. 5C is a partial front view of frame 14a with runner 96 located thereon. Hood 30 and hood 31 are shown and are supported by runner 96. A rotatable stop 97 is shown in engagement with stop 96a on runner 96 to prevent lateral displacement of runner 96 on rail 96. That is the pressure cylinder arm is extended which cause arm 97b to pivot stop 97 about 97a to bring the rotatable stop 97 to the condition shown in FIG. 5C. This prevents lateral shifting of the carriage 28 and the carriage 28a as well as the support rails and cable drive mechanism.

Figure 5D:
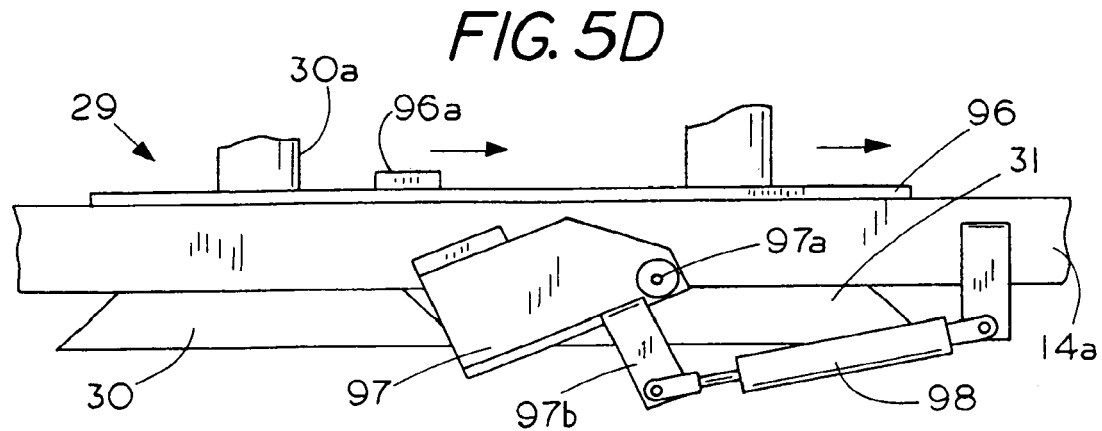
FIG. 5D is the partial front view of the carriage displacement mechanism of FIG. 5C in a second position.

In order to shift the rails laterally, the rotatable stop 97 is pivoted counterclockwise as shown in FIG. 5D. This disengages stop 96a and stop 97 which allows runner 96 to be shifted from the first position shown in FIG. 5C to the second position shown in FIG. 5D. That is the sod carriages 28 and 28a are shifted in the direction of the arrows by a power cylinder or the like (not shown). Thus both the suction hoods 30 and 31 are laterally shifted with respect to a sod being stacked using suction hoods 30 and 31. As a result when one drops sod slabs from the suction hoods when the suction hoods are in the second position the sod slabs will also be shifted from sod slabs that were dropped from the first position. This feature of the sod shift system proves for lateral displacement of the sod labs in one direction. To obtain lateral displacement of the sod slabs along the direction of the rails the carriage stop or drop off condition is controlled by a processor (not shown) that determines when the cable drive mechanism 48 is stopped on the rails. As a result the position of suction hoods can be altered in two mutually perpendicular axis and thus provide displacement in both the x and y axis as illustrated by the sod layers in FIG. 17-FIG. 22.

Thus the sod transfer mechanism 14 provides lateral shifting of sod slabs through sod shift mechanism 29 with laterally shiftable members that includes a track supported by runners 96 which are slidable along frame member 14a, a carriage 28 displaceable along the track with a sod holding apparatus secured to the carriage 28. A cable 75 secured to the carriage 28 with a rotatable cable drum 73 for winding the cable thereon to thereby controllable displace the carnage 28 secured to the cable 75 to thereby permit a transport of a sod slab supported by sod holding apparatus from a first location to a second location along the axis of the tracks.

The sod shift mechanism 29 provides for lateral displacement of the entire carriage and tracks so that the sod supported thereon can be laterality positioned with respect to a first layer of sod deposited by carriage 28 and the cable drive mechanism provides for shifting the sod drop off position along a rail axis by controlling the stop position of the carriage 28 and 28a.

We claim:

1. A sod transfer system comprising:
   a conveyor including at least one belt and operative to support a sod slab;
   a bump bed positioned below said conveyor; and
   a lift mechanism for elevating said bump bed through and above said conveyor to thereby lift the sod slab free of said conveyor, wherein the lift mechanism includes:
      a slider positioned between a pair of slider blocks to direct the slider along a lift axis; and
      a drive shaft operably linked to said slider such that said drive shaft is rotatable in a first direction to lift a sod slab from the conveyor and rotatable in an opposite direction to lift a further sod slab from the conveyor.

2. The sod transfer system of claim 1 wherein the conveyor comprises a set of transversely spaced apart conveyor belts and the bump bed is positioned between the set of spaced apart conveyor belts.

3. The sod transfer system of claim 2, wherein the set of spaced apart conveyor belts are aligned in parallel to one another.

4. The sod transfer system of claim 3, wherein the bump bed comprises a rail with beveled ends and the rail is aligned in parallel with the set of spaced apart conveyor belts.

5. The sod transfer system of claim 1 wherein the bump bed includes a rail with beveled ends.

6. The sod transfer system of claim 1 wherein the conveyor moves in a first direction and the bump bed moves in a direction transverse to the first direction to thereby elevate the sod slab therefrom.

7. The sod transfer system of claim 1 wherein the conveyor includes three transversely spaced apart conveyor belts and the bump bed includes a first set of rails positioned between an adjacent two of the three conveyor belts and a second set of rails positioned between a further adjacent two of the three conveyor belts.

8. A method of sod transfer comprising carrying a sod slab in a first direction and, while the sod slab is being carried in the first direction, terminating the carrying by elevating the sod slab in a second direction transverse to the first direction by lifting the sod slab from an underside of the sod slab, wherein elevating the sod slab is carried out using a bump bed and wherein the method further comprises imparting sufficient momentum to the underside of the sod slab during the elevating of the slab to throw the sod slab upward from the bump bed.

9. The method of sod transfer of claim 8 where the sod slab is moved from the first direction to the second direction while the sod slab is being moved in the first direction.

10. The method of sod transfer of claim 8 including the step of retracting the bump bed to enable a further sod slab traveling in a first direction to be elevated in a second direction transverse to the first direction by lifting the further sod slab from an underside of the further sod slab.

\* \* \* \* \*